(12) United States Patent
Kuno et al.

(10) Patent No.: US 11,112,610 B2
(45) Date of Patent: Sep. 7, 2021

(54) IMAGE DISPLAY DEVICE AND HEAD MOUNTED DISPLAY USING THE SAME

(71) Applicant: Hitachi-LG Data Storage, Inc., Tokyo (JP)

(72) Inventors: Takuma Kuno, Tokyo (JP); Ryuji Ukai, Tokyo (JP); Toshiteru Nakamura, Tokyo (JP); Masahito Uchiyama, Tokyo (JP); Takahiro Mouri, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/850,254

(22) Filed: Apr. 16, 2020

(65) Prior Publication Data

US 2021/0063743 A1 Mar. 4, 2021

(30) Foreign Application Priority Data

Aug. 26, 2019 (JP) .............................. JP2019-153574

(51) Int. Cl.
*G02B 6/26* (2006.01)
*G02B 27/01* (2006.01)
*F21V 8/00* (2006.01)

(52) U.S. Cl.
CPC ......... *G02B 27/0172* (2013.01); *G02B 6/003* (2013.01); *G02B 6/0031* (2013.01); *G02B 2027/011* (2013.01); *G02B 2027/0118* (2013.01); *G02B 2027/0123* (2013.01)

(58) Field of Classification Search
CPC .. G02B 27/0172; G02B 6/0031; G02B 6/003; G02B 2027/011; G02B 2027/0123; G02B 2027/0118; G02B 6/0028; G02B 6/0033
See application file for complete search history.

(56) References Cited

U.S. PATENT DOCUMENTS

| | | | |
|---|---|---|---|
| 9,182,597 B2* | 11/2015 | Dominici | G02B 27/106 |
| 10,481,319 B2* | 11/2019 | Danziger | G02B 27/0172 |
| 2003/0165017 A1 | 9/2003 | Amitai | |
| 2005/0180687 A1* | 8/2005 | Amitai | G02B 6/003 385/31 |
| 2011/0019250 A1 | 1/2011 | Aiki et al. | |
| 2014/0003762 A1* | 1/2014 | Macnamara | G02F 1/011 385/8 |
| 2019/0212487 A1* | 7/2019 | Danziger | G02B 27/0081 |

FOREIGN PATENT DOCUMENTS

| | | |
|---|---|---|
| JP | 2011-248318 A | 12/2011 |
| JP | 2013-210633 A | 10/2013 |

\* cited by examiner

*Primary Examiner* — Ellen E Kim
(74) *Attorney, Agent, or Firm* — Mattingly & Malur, PC

(57) ABSTRACT

An image display device projecting an image to a user includes: an image generation unit that generates image light; a projection optical unit that projects the image light generated by the image generation unit; an image light duplication unit that duplicates and emits the image light projected by the projection optical unit; and a light-guiding unit that projects the image light duplicated by the image light duplication unit to a user, in which the projection optical unit includes at least one projection lens, and in which an interval at which the image light duplication unit duplicates the image light is smaller than an outer diameter of the projection lens.

19 Claims, 17 Drawing Sheets

IMAGE DISPLAY DEVICE AND HEAD MOUNTED DISPLAY USING THE SAME

CROSS-REFERENCE TO RELATED APPLICATION

The present application claims priority from Japanese application JP2019-153574, filed on Aug. 26, 2019, the contents of which is hereby incorporated by reference into this application.

BACKGROUND OF THE INVENTION

1. Field of the Invention

The present invention relates to an image display device using a light-guiding plate used for a head mounted display or the like.

2. Description of the Related Art

In image display devices such as a head mounted display (HMD) and a head up display (HUD), as an optical system for propagating image light emitted from a projection optical unit to eyes of a user, a light-guiding plate is used.

In an image display device used for an HMD or an HUD, the area of an eye box, which is a region where an image can be visually recognized even though the eyes move, is important from the viewpoint of visibility and wearability. In addition, the HMD is assumed to perform work assistance such as assistance in daily life and maintenance and inspection, and the image display device is required to have high light use efficiency in order to realize long-time driving.

As cited documents in this technical field, JP 2013-210633 A and JP 2011-248318 A are exemplified. JP 2013-210633 A discloses an image display device that enlarges an eye-box by duplicating an exit pupil in a vertical direction by using a plurality of partial reflection surfaces and duplicating an exit pupil in a horizontal direction by using a light-guiding plate. In addition, JP 2011-248318 A discloses an image display device that enlarges an eye box by duplicating an exit pupil two-dimensionally by using two light-guiding plates provided with a diffraction grating.

JP 2013-210633 A does not disclose the relationship between a plurality of duplicated exit pupils. For this reason, according to a method of duplicating the exit pupil, brightness unevenness may occur in the plurality of exit pupils, and as a result, brightness unevenness may occur in the displayed image.

In addition, in JP 2013-248318 A, since the exit pupil using a diffraction grating cannot use all lights incident on the light-guiding plate, the light use efficiency is low, and thus, an image display device with high light use efficiency cannot be realized.

SUMMARY OF THE INVENTION

The present invention has been made in view of such a situation, and the present invention is to provide an image display device having a wide eye box and being capable of displaying an image with high light use efficiency and without brightness unevenness, and an HMD using the same.

According to the present invention, as an example, there is provided an image display device projecting an image to a user, including: an image generation unit that generates image light; a projection optical unit that projects the image light generated by the image generation unit; an image light duplication unit that duplicates and emits the image light projected by the projection optical unit; and a light-guiding unit that projects the image light duplicated by the image light duplication unit to a user, in which the projection optical unit includes at least one projection lens, and in which an interval at which the image light duplication unit duplicates the image light is smaller than an outer diameter of the projection lens.

According to the present invention, it is possible to provide an image display device having a wide eye box and being capable of displaying a uniform image with high light use efficiency and reduced brightness unevenness, and an HMD using the same.

DETAILED DESCRIPTION OF THE PREFERRED EMBODIMENTS

Hereinafter, embodiments of the present invention will be described with reference to the drawings.

First Embodiment

<HMD>

Figure 1:
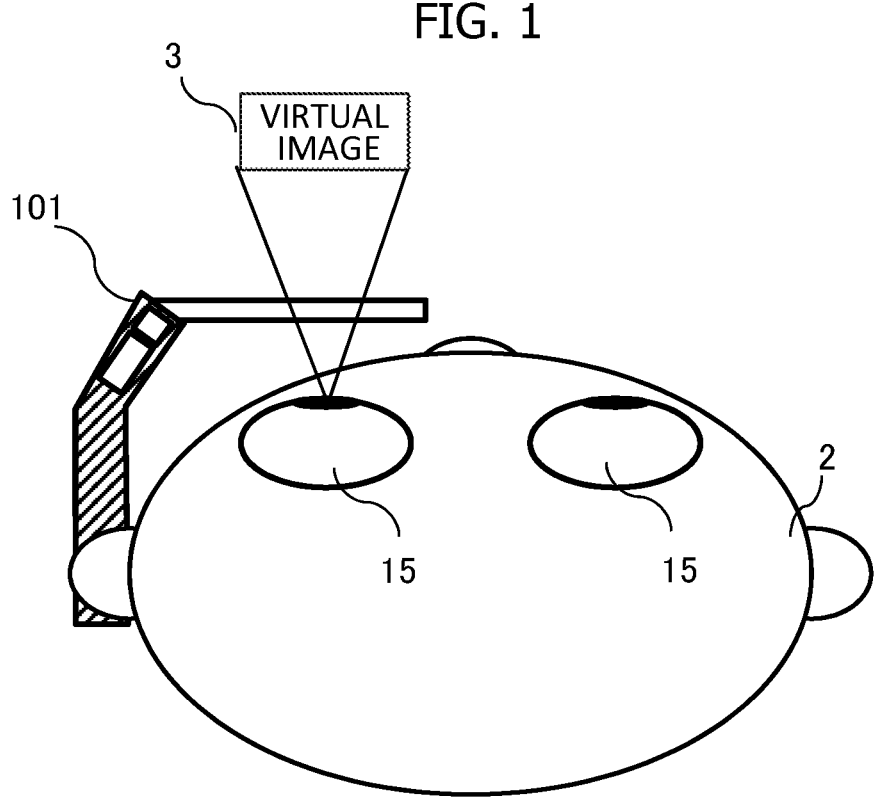
FIG. 1 is a view illustrating a usage form of an HMD according to a first embodiment.

FIG. 1 is a view illustrating a usage form of an HMD according to the present embodiment. As illustrated in FIG. 1, the HMD 101 is mounted on the head of a user 2, and the user 2 can visually recognize an image from an image display device (not illustrated) as a virtual image 3 through pupils 15 of the user in a state where the external world is visible. In addition, although FIG. 1 illustrates a case where an image is displayed on one-side eye, a configuration of both eyes may be used.

Figure 2:
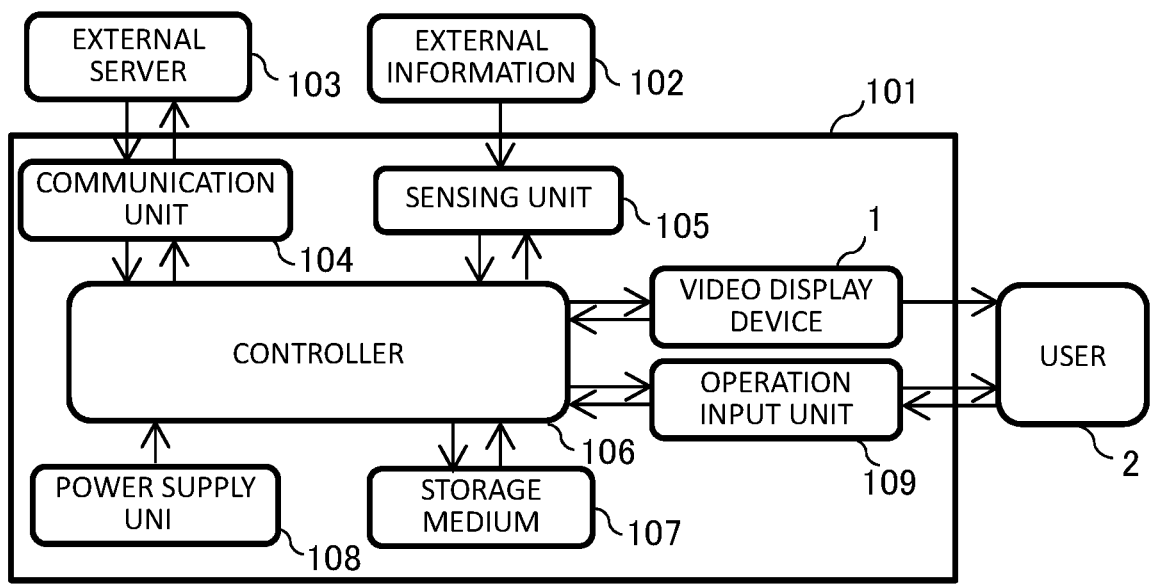
FIG. 2 is a functional block configuration view of an HMD equipped with an image display device according to the first embodiment.

FIG. 2 is a functional block configuration view of the HMD 101 equipped with the image display device 1 according to the present embodiment. In FIG. 2, the HMD 101 includes, in addition to the image display device 1, a controller 106 for controlling the entire HMD 101, a sensing unit 105 for acquiring external information 102, a communication unit 104 for communicating with an external server 103, a power supply unit 108, a storage medium 107, an operation input unit 109, and the like. In addition, the control lines and the information lines indicate those that are considered to be necessary for the description, but all the control lines and the information lines are not necessarily indicated.

The external information 102 is, for example, information of the posture, orientation, and movement of the user 2, the brightness, sound, and space information of the external world, and the like.

As an example of the sensing unit that detects the posture, orientation, and movement of the user 2, an inclination sensor, an acceleration sensor, a GPS sensor, and the like may be exemplified. An imaging element such as an illumination sensor, a sound sensor, and an infrared sensor can be mounted as the sensing unit for detecting brightness, sound, and space information of the external world.

The communication unit 104 is a communication device that can access information on the Internet and an external server 103 such as an electronic device of a smartphone, a tablet, a PC, or the like, and the communication unit can be realized by, for example, Bluetooth (registered trademark), Wifi (registered trademark), or the like.

The user 2 performs inputting for operating the HMD 101 by the operation input unit 109. The operation input unit 109 can be realized by, for example, voice recognition by using a sound sensor, touch panel inputting by using a pressure-sensitive sensor or an electro-static capacitance sensor, gesture inputting by using an infrared sensor, or the like.

<Image Display Device>

Figure 3:
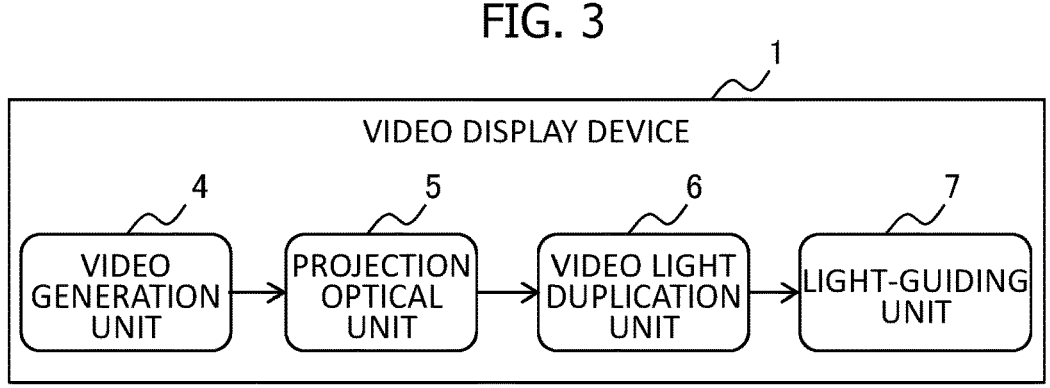
FIG. 3 is a functional block configuration view of the image display device according to the first embodiment.

FIG. 3 is a functional block configuration view of the image display device according to the present embodiment. The image display device 1 includes an image generation unit 4, a projection optical unit 5, an image light duplication unit 6, and a light-guiding unit 7.

The image generation unit 4 is configured with a light source, an illumination optical unit, and an image generation device that generates an image. As the light source, a light emitting diode (LED) of RGB and a laser diode (LD) of RGB may be exemplified. Of course, as the light source, a white LED may be used. In this case, it is necessary to provide a color filter to the image generation element. The illumination optical unit allows the light of the light source to be uniform and illuminates the image generation device with the light. As the image generation device a liquid crystal, a digital mirror device (DMD), or the like may be used. In addition, as the image generation device, a self-luminous image generation element such as an organic EL or a µLED may be used. In this case, the light source and the illumination optical unit become unnecessary, and it is possible to reduce the size and weight of the image generation unit 4.

The projection optical unit 5 includes a projection lens configured with one or a plurality of lenses and projects the image generated by the image generation unit 4.

The image light duplication unit 6 transmits the image light to the light-guiding unit 7 while duplicating the exit pupil of the projection lens of the projection optical unit 5.

The light-guiding unit 7 can be formed as an image display device 1 having see-through properties by using, for example, a diffraction grating, a volume hologram, or a light-guiding plate having a plurality of partial reflection surfaces and an HMD including the same.

Figure 4A:
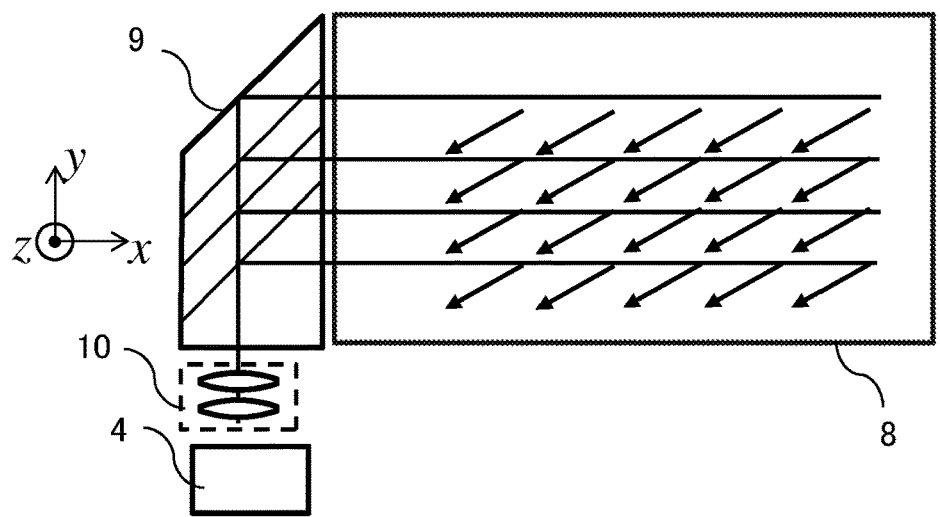
FIGS. 4A and 4B are configuration views of the image display device according to the first embodiment.
Figure 4B:
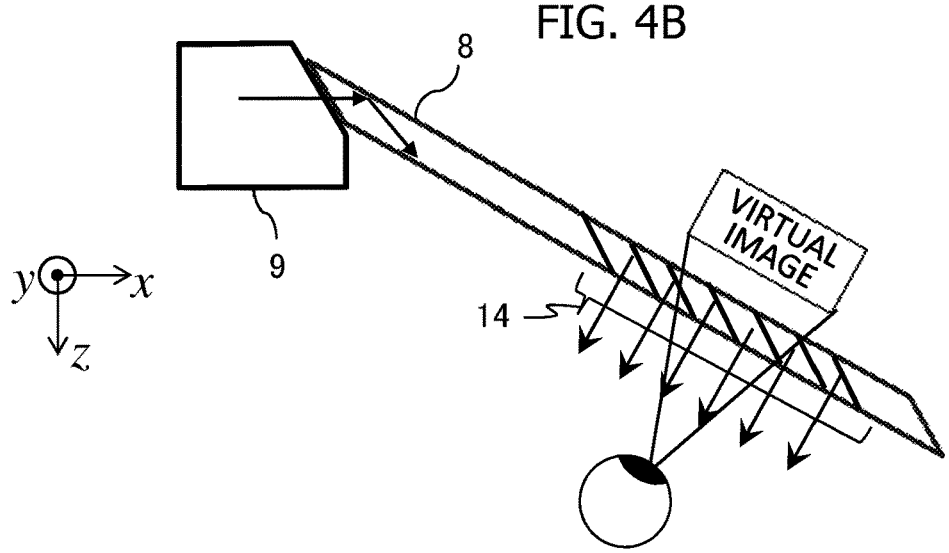

FIGS. 4A and 4B are configuration views of the image display device according to the present embodiment. FIG. 4A illustrates a view as viewed from the front side of the light-guiding plate 8, and FIG. 4B illustrates a view as viewed from the upper side of the light-guiding plate 8. In FIG. 3, the image light duplication unit 6 includes a pupil enlargement prism 9, and the light-guiding unit 7 includes a light-guiding plate 8 having a plurality of partial reflection surfaces inside a transparent substrate. The projection optical unit 5 is configured with, for example, a projection optical unit 10 including two lenses.

As described above, the projection optical unit 10 emits the image light generated by the image generation unit 4 to the pupil enlargement prism 9. The pupil enlargement prism 9 duplicates the pupil in the y direction in FIGS. 4A and 4B by means of the partial reflection surface arranged inside and emits the image light to the light-guiding plate 8 in the x direction. The image light incident on the light-guiding plate 8 duplicates the pupil in the direction of propagation of the image light by means of the partial reflection surface array 14 arranged inside while propagating through the inside of the light-guiding plate by total reflection and projects the image light to the user. By enlarging the pupil two-dimensionally by means of the pupil enlargement prism 9 and the light-guiding plate 8, the image display device having a wide eye box can be realized.

<Light-Guiding Plate>

Figure 5A:
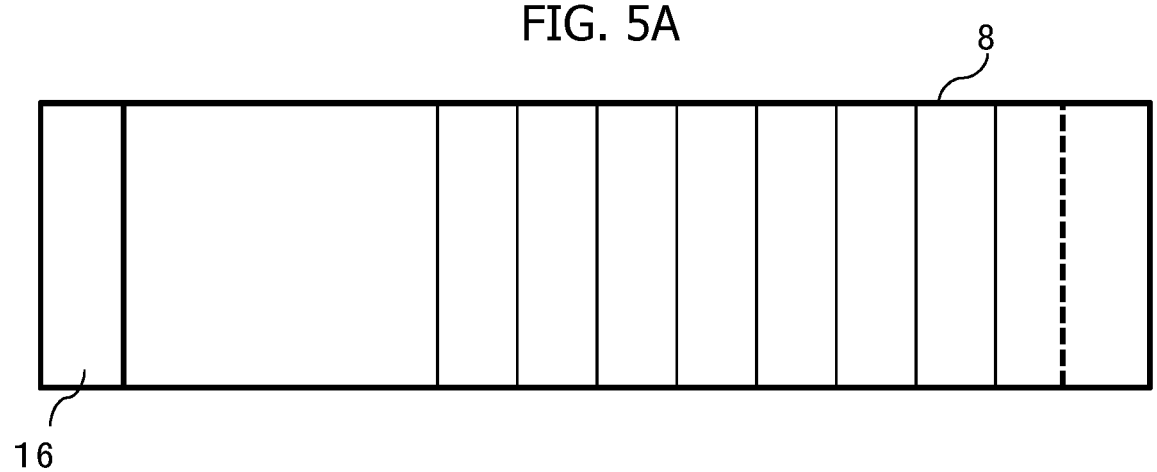
FIGS. 5A and 5B are views describing a configuration of a light-guiding plate according to the first embodiment.
Figure 5B:
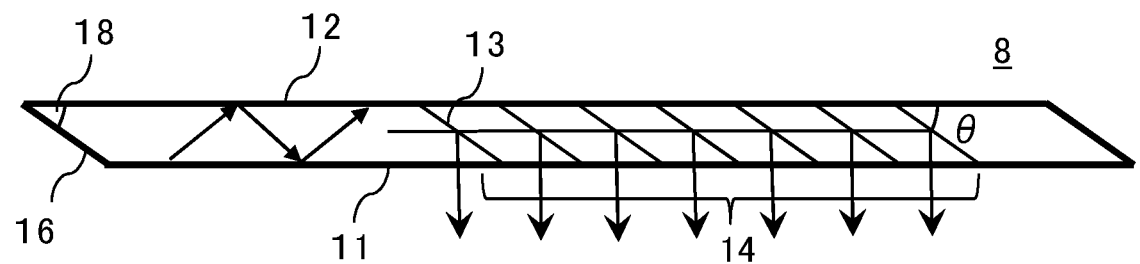

Next, the configuration of the light-guiding plate will be described. FIGS. 5A and 5B are configuration views of the light-guiding plate according to the present embodiment. FIG. 5A illustrates a front view of the light-guiding plate 8, and FIG. 5B illustrates a plan view of the light-guiding plate 8.

In FIGS. 5A and 5B, the light-guiding plate 8 includes an incident surface 16, a first internal reflection surface 11 and a second internal reflection surface 12 substantially parallel to each other and includes a partial reflection surface array 14 where a plurality of partial reflection surfaces 13 parallel to each other are arranged inside. The image light emitted from the pupil enlargement prism 9 propagates in the lateral direction (horizontal direction) in the figure due to the total reflection by the first internal reflection surface 11 and the second internal reflection surface 12. In addition, the partial reflection surface array 14 reflects a portion of the image light guided by total reflection, changes the traveling direction, transmits the light through the first internal reflection surface 11, and emits the light to the outside of the light-guiding plate 8. Since the image light is duplicated by being reflected by the partial reflection surface array 14, the horizontal eye box is enlarged. A portion of the image light emitted to the outside of the light-guiding plate 8 is incident on the pupil 15 of the user. Accordingly, the user can visually recognize the image displayed by the image display device 1.

<Light-Guiding Plate Interval>

Figure 6A:
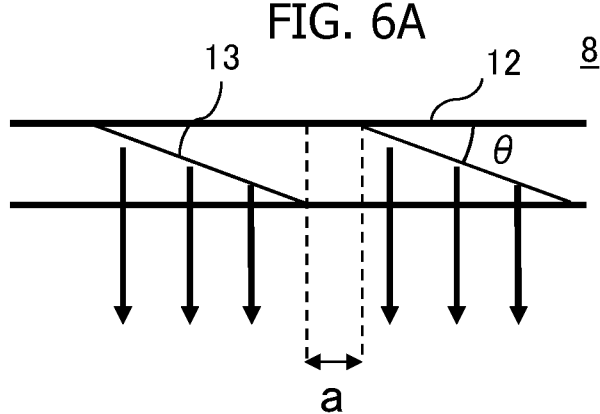
FIGS. 6A to 6C are views describing a surface interval of a partial reflection surface array according to the first embodiment.
Figure 6B:
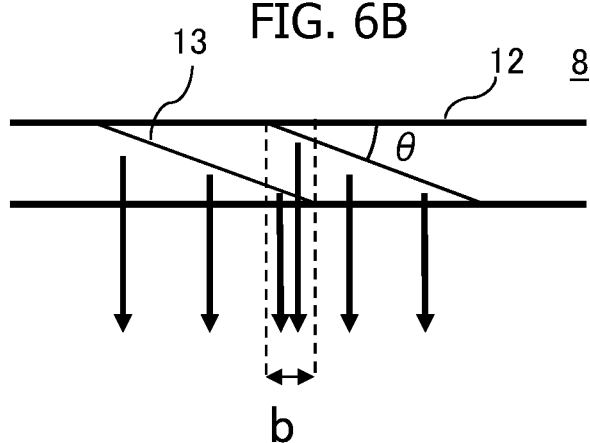
Figure 6C:
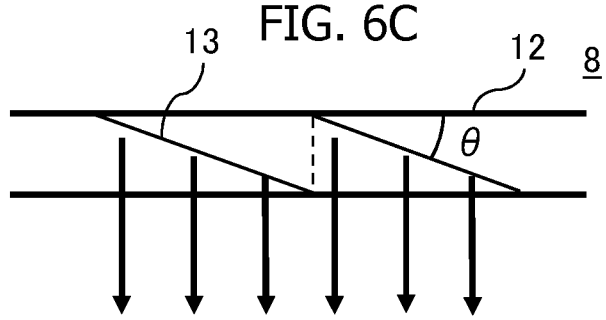

Next, the reflection surface interval of the partial reflection surface array 14 will be described. FIGS. 6A to 6C are views illustrating a portion of the light-guiding plate 8 according to the present embodiment, and are views describing a surface interval of the partial reflection surface array.

FIG. 6A illustrates a case where the partial reflection surfaces 13 are arranged apart from each other as viewed from the front of the light-guiding plate, FIG. 6B illustrates a case where the partial reflection surfaces 13 are arranged with an overlap, and FIG. 6C illustrates a case where the partial reflection surfaces 13 are arranged with no overlap and no gap.

In a case where the partial reflection surfaces 13 are arranged apart from each other as viewed from the front of the light-guiding plate as illustrated in FIG. 6A, there exists a region where the image light is not emitted such as the region "a" in FIG. 6A, and thus, dark lines occur in the image projected to the user, which results in brightness unevenness.

In a case where the partial reflection surfaces are arranged with an overlap as illustrated in FIG. 6B, there exists a region where the image light is emitted from the two partial reflection surfaces such as the region "b" in FIG. 6B, and thus, bright lines occur in the image projected to the user, which results in brightness unevenness.

For this reason, it is preferable that the intervals between the partial reflection surfaces 13 are arranged so that the partial reflection surfaces 13 do not substantially overlap and have substantially no gap as illustrated in FIG. 6C. By using the light-guiding plate in which the partial reflection surfaces 13 have no overlap and are arranged without gaps, it is possible to project an image with less brightness unevenness to the user.

<Angle of Partial Reflection Surface>

Figure 7A:
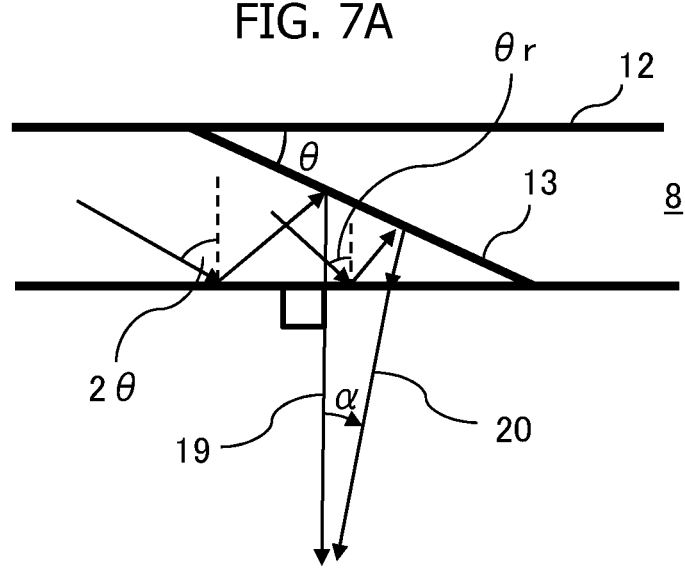
FIGS. 7A and 7B are views illustrating an inside of the light-guiding plate and optical paths of image lights emitted from the light-guiding plate according to the first embodiment.
Figure 7B:
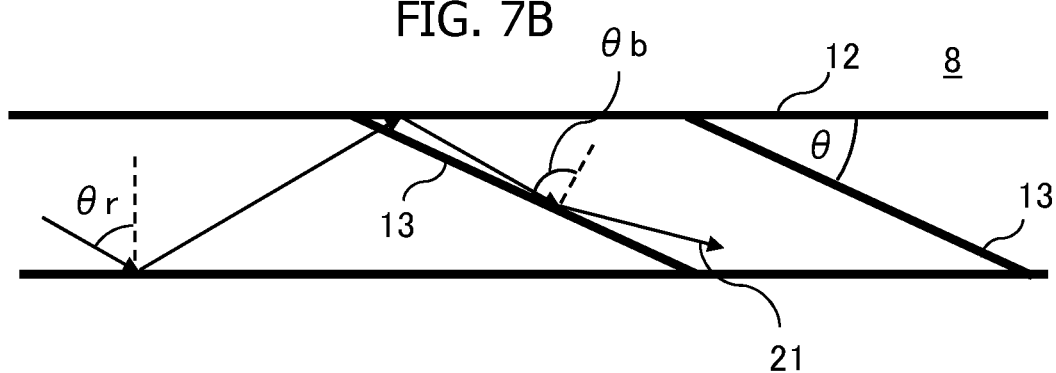

Next, the angle θ of the partial reflection surface array 14 with respect to the second internal reflection surface 12 will be described. FIGS. 7A and 7B are views illustrating the inside of the light-guiding plate and the optical paths of image lights emitted from the light-guiding plate according to the present embodiment.

FIG. 7A illustrates optical paths of the image lights propagating inside the light-guiding plate by total reflection from the time of being reflected by the partial reflection surface 13 to the time of being emitted from the light-guiding plate 8. The angle θ needs to be an angle at which the image light can propagate inside the light-guiding plate by total reflection. The incident angle with respect to the light-guiding plate surface when the light 19 at the center of the field of view totally reflecting inside the light-guiding plate propagates through the inside of the light-guiding plate can be denoted by 2θ. The angle θr at which the light 20 projected to the user at an angle α with respect to the center of the angle of view is incident on the light-guiding plate surface inside the light-guiding plate can be expressed by Formula 1 by using the refractive index n of the light-guiding plate.

$$\theta r = 2\theta - \arcsin(\sin\alpha \div n) \quad (1)$$

The condition for total reflection of the light incident at θr can be expressed as in Formula 2 by using a critical angle θc=arcsin (1÷n) determined by the refractive index of the light-guiding plate 8.

$$\theta r = 2\theta - \arcsin(\sin\alpha \div n) > \theta c \quad (2)$$

In order to allow the image light to propagate the light-guiding plate 8, it is necessary to satisfy the above-described Formulas at all the angles of view of the image light. When the horizontal field of view (FOV) of the image light is denoted by FOV_H, the angle θ of the partial reflection surface needs to satisfy Formula 3 from the above-described Formulas.

$$\theta > 0.5 \times (\arcsin(\sin(FOV\_H \div 2) \div n) + \theta c) \quad (3)$$

Next, consider is a case where the image light is incident on the back surface of the partial reflection surface 13 as illustrated in FIG. 7B. The light reflected on the back surface of the partial reflection surface 13 like the light beam 21 cannot be used as the image light. For this reason, the light beam 21 causes a light loss. In addition, since the predetermined angle of view component of the exit pupil becomes dark, brightness unevenness occurs in the displayed image. Since the back surface reflection can occur a plurality of times by the partial reflection surface array 14, it is preferable that the reflectance when the light beam is incident on the partial reflection surface 13 at a large angle like the light beam 21 is as small as possible. The angle θb at which the light propagating inside the light-guiding plate by total reflection at the angle θr is incident on the partial reflection surface can be expressed by Formula (4).

$$\theta b = \theta + \theta r = 3\theta - \arcsin(\sin\alpha \div n) \quad (4)$$

Typically, since there is a difference in the refractive index between the reflection film and the light-guiding plate constituting the partial reflection surface, the back surface reflection is sharply increased as the incident angle θb approaches 90 degrees. For this reason, for all the image lights, θb needs to be set to 90 degrees or less, preferably 86 degrees or less, more preferably 83 degrees or less.

Therefore, at least Formula 5 needs to be satisfied.

$$3\theta + \arcsin(\sin(FOV\_H \div 2) \div n) < 90 \quad (5)$$

In terms of θ, $$\theta < 30 - \arcsin(\sin(FOV\_H \div 2) \div n) \div 3 \quad (6)$$

From Formulas 3 and 6, a preferable range of the angle θ of the partial reflection surface can be obtained from the refractive index n of the light-guiding plate and the horizontal angle of view FOV_H of the image light.

When the refractive index n of general glass or resin is 1.5 to 1.7 and the angle of view (FOV_H) of the HMD in the horizontal direction is 10 to 40 degrees, the partial reflection surface angle θ obtained from Formulas 3 and 6 may be in a range of 18 degrees to 30 degrees.

<Reflectance of Partial Reflection Surface>

With respect to the reflectance of the partial reflection surface array 14, a configuration where the reflectances of the partial reflection surfaces 13 are different from each other can be considered, but since the design, the mounting, or the like of a plurality of coats are required, the cost is increased. For this reason, it is preferable that a partial reflection surface array is configured with the partial reflection surfaces having substantially equal reflectance in terms of cost.

In addition, the higher the reflectance of the partial reflection surface array 14 is, the higher the brightness of the image projected to the user is, so that the light use efficiency of the image display device can be improved. However, the higher the reflectance of the partial reflection surface array 14 is, the lower the transmittance of the light from the external world that the user visually recognizes through the light-guiding plate is, so that the see-through property is reduced. For this reason, from the viewpoint of a see-through property, it is preferable that the reflectance of the partial reflection surface array 14 be at least 30% or less.

Since the back surface reflection such as the light beam 21 in FIG. 7B reflected on the back surface of the partial reflection surface causes light loss and brightness unevenness, it is preferable to suppress the back surface reflectance as much as possible. The light-guiding plate substrates may be bonded by using an adhesive or may be bonded by an optical contact. If an adhesive is used to bond the substrates, the reflectance on the back surface is increased due to the difference in the refractive index between the light-guiding plate and the adhesive. It is effective to perform bonding by using the optical contact in order to suppress the back surface reflection. In that case, in addition, since scattering of light that may occur with the adhesive can be suppressed, it is possible to improve the contrast and the see-through property.

In addition, if the reflectance of the partial reflection surface 13 is increased, the back surface reflectance of the back surface is also increased, and thus, the influence of light loss and brightness unevenness due to the back surface reflection is increased. For this reason, if the influence of light loss and brightness unevenness due to the back surface reflection is considered, it is preferable that the reflectance of the partial reflection surface 13 is 15% or less.

<Pupil Enlargement Function>

Figure 8:
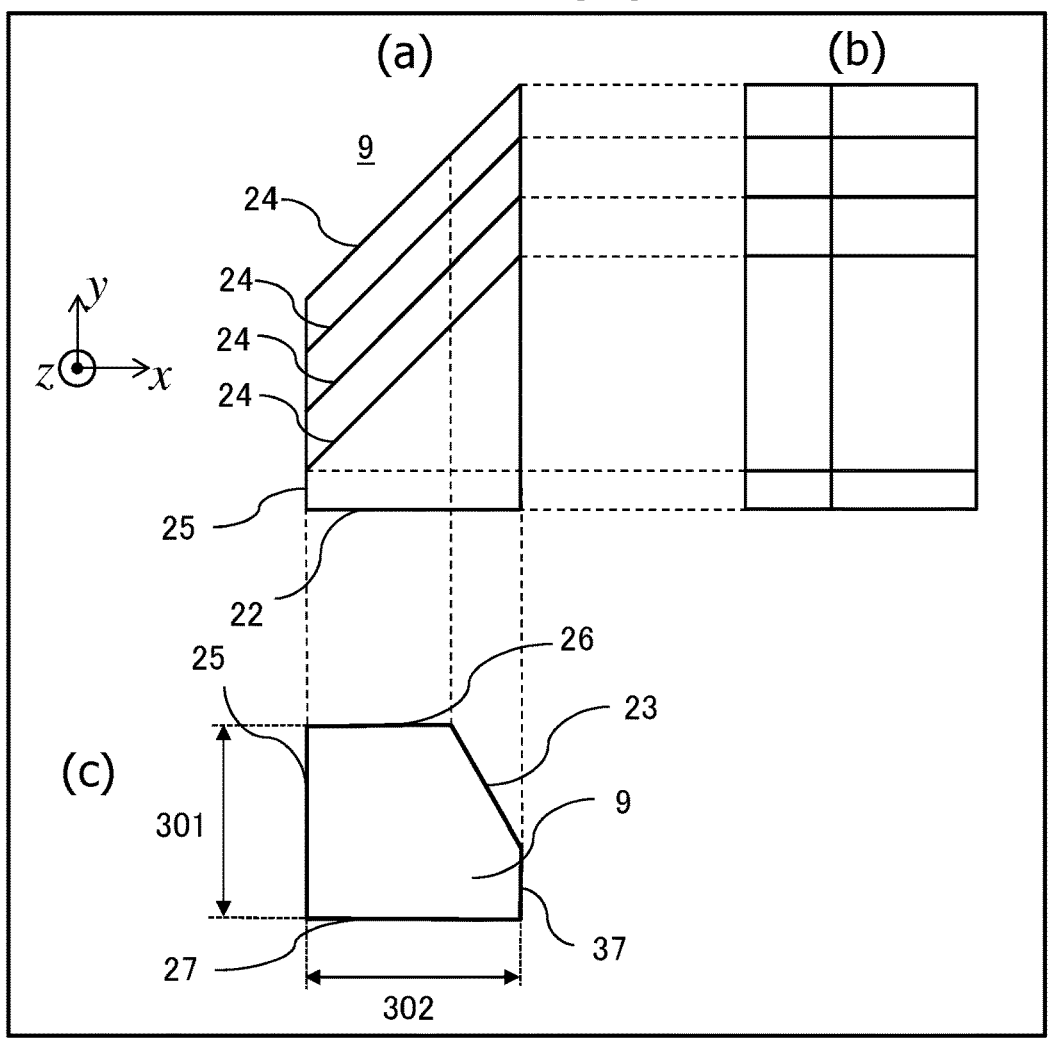
FIG. 8 is a view describing a configuration of a pupil enlargement prism according to the first embodiment.

FIG. 8 is a view describing the configuration of the pupil enlargement prism according to the present embodiment. In FIG. 8, (a), (b), and (c) illustrate a front view, a side view, and a plan view of the pupil enlargement prism 9, respectively. In FIG. 8, the pupil enlargement prism 9 includes an incident surface 22 and an outgoing surface 23 and includes a plurality of partial reflection surfaces 24. The partial reflection surfaces 24 are substantially parallel to each other. FIG. 8 illustrate the pupil enlargement prism 9 having four partial reflection surfaces 24 as an example, but the number of partial reflection surfaces may be smaller or larger than four. Hereinafter, the partial reflection surfaces 24 are referred to as a first partial reflection surface and a second partial reflection surface in order from the side closer to the incident surface 22.

In FIG. 8, the image light emitted by the projection optical unit 5 is incident on the pupil enlargement prism 9 from the incident surface 22. The pupil enlargement prism 9 is made of a medium having high transparency, and light incident from the incident surface 22 propagates inside the pupil enlargement prism 9. The material of the pupil enlargement prism 9 may be, for example, a glass or a resin. In addition, in order to prevent multiple images from being displayed, it is preferable that the material of the pupil enlargement prism 9 has no or little birefringence.

The image light incident on the pupil enlargement prism 9 propagates inside the pupil enlargement prism 9, is reflected by the plurality of partial reflection surfaces 24, and is emitted from the outgoing surface 23. It is preferable that the image light emitted by the projection optical unit 5 is configured to propagate without being totally reflected by the outgoing surface 23 and the side surfaces 25, 26, and 27 of the pupil enlargement prism 9. If the image light is totally reflected, in some cases, inversion and stray light of the image may occur, and this configuration can prevent the resolution of the image from being decreased.

<Pupil Enlargement Prism and Projection Lens>

Figure 9:
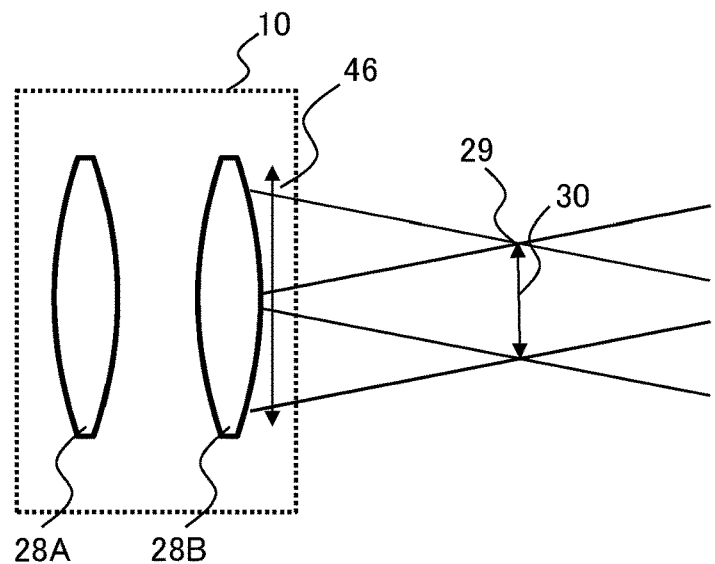
FIG. 9 is a view describing a projection optical unit according to the first embodiment.

FIG. 9 is a view illustrating the projection optical unit 10 which is an example of the projection optical unit 5 according to the present embodiment. FIG. 9 illustrates an example in which the projection optical unit 10 has two lenses 28A and 28B. In FIG. 9, reference numeral 29 denotes an exit pupil of the projection optical unit 10, reference numeral 30 denotes an exit pupil diameter of the projection optical unit 10, and reference numeral 46 denotes a projection lens diameter. In addition, the projection lens diameter indicates the outer diameter of the lens closest to the image light duplication unit 6. The image light emitted by the projection optical unit 10 is duplicated by the image light duplication unit 6 to become a plurality of image lights, and after, the plurality of image lights are incident on the light-guiding plate 8. If the exit pupil 29 is greatly apart from the position of the incident surface of the light-guiding plate, the exit pupil 29 is lacking when the light-guiding plate is incident, so that brightness unevenness occurs. In addition, the coupling efficiency of the image light to the light-guiding plate 8 is decreased. For this reason, the position of the exit pupil 29 of the projection optical unit 5 is preferably closer to the image light duplication unit 6 than to the image projection unit, and is more preferably inside the image light duplication unit 6. The position of the exit pupil 29 of the projection optical unit 5 is preferably substantially equal to the position of the incident surface 16 of the light-guiding plate 8. Accordingly, it is possible to reduce brightness unevenness due to lack of the exit pupil, increase the coupling efficiency of the image light emitted by the image light duplication unit 6 to the light-guiding plate 8, and increase the light use efficiency of the entire image display device.

From another viewpoint of the present embodiment, when the position of the exit pupil 29 of the projection optical unit 5 is located inside the image light duplication unit 6, since the image light emitted by the projection optical unit 5 has the smallest effective optical diameter at the position of the exit pupil, the image light duplication unit 6 can be miniaturized by configuring the exit pupil of the projection optical unit 5 to be located inside the image light duplication unit 6.

<Reproduction of Uniform Pupil by Pupil Enlargement Prism>

Next, a configuration for preventing brightness unevenness from occurring when the pupil enlargement prism duplicates the exit pupil will be described.

Figure 10A:
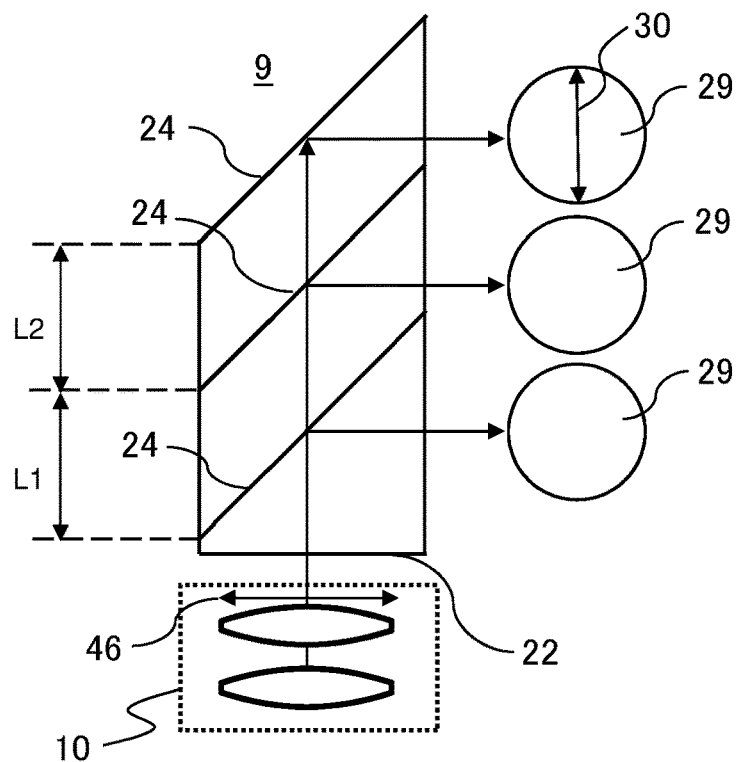
FIGS. 10A and 10B are views describing an exit pupil duplicated by a pupil enlargement prism according to the first embodiment.
Figure 10B:
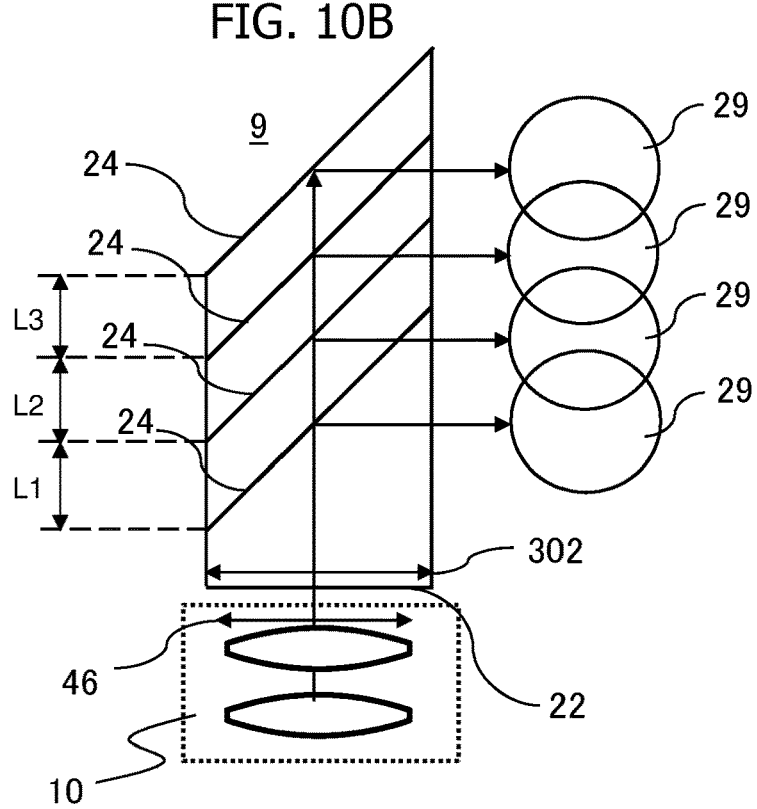

FIGS. 10A and 10B schematically illustrate the exit pupil 29 duplicated by the pupil enlargement prism 9 according to the present embodiment and illustrate the positional relationship between the main light beam of the projection optical unit 10 and the exit pupil 29 that is duplicated by the pupil enlargement prism 9. Actually, the optical path where the light is reflected twice or more on the partial reflection surface can be also considered, but from the viewpoint of light use efficiency of the optical path illustrated in FIGS. 10A and 10B, the optical path where a main component of the image light is reflected twice or more on the partial reflection surface is omitted.

FIG. 10A illustrates the pupil enlargement prism 9 including three partial reflection surfaces 24 as an example. As illustrated in FIG. 10A, in a case where the intervals between the plurality of exit pupils 29 duplicated by the pupil enlargement prism 9 are larger than an exit pupil diameter 30, gaps occur between the plurality of exit pupils 29 duplicated by the pupil enlargement prism 9. If there are gaps between the exit pupils 29, there are also gaps between the image lights emitted from the light-guiding plate 8, and when the user views the image from the vicinity of the gaps, the user visually recognizes the image of which a portion of the image is noticeably dark.

FIG. 10B illustrates the pupil enlargement prism 9 having four partial reflection surfaces 24 as an example. The number of partial reflection surfaces may be smaller or larger than four. As illustrated in FIG. 10B, by allowing the intervals between the plurality of exit pupils 29 duplicated by the pupil enlargement prism 9 to be smaller than the exit pupil diameter 30, the plurality of exit pupils 29 overlap, and the region where a portion of the above-mentioned image is noticeably dark disappear in the image projected from the light-guiding plate. That is, it is preferable that intervals L1, L2, and L3 between the partial reflection surfaces 24 are smaller than the exit pupil diameter 30. In other words, since the projection lens diameter 46 is larger than the exit pupil diameter 30, and an incident width 302 is larger than the projection lens diameter 46, the intervals L1, L2, and L3 of the partial reflection surfaces 24 need to be allowed to be smaller than the projection lens diameter 46 and need to be allowed to be smaller than the incident width 302. With such a configuration, it is possible to prevent image loss or dark lines from occurring in the image light emitted from the light-guiding plate 8.

Herein, it is preferable that the projection lens mounted on the HMD has a small size, and usually, the projection lens diameter 46 is 15 mm or less. An extremely small-sized projection lens has a small exit pupil diameter, and thus, it is difficult to duplicate the exit pupil. For this reason, the projection lens diameter 46 is preferably 1 mm or more. Therefore, it is preferable that the intervals between the partial reflection surfaces are in a range of 1 mm to 15 mm.

Next, the configurations of the pupil enlargement prism 9 and the projection optical unit 10 for emitting a uniform exit pupil will be described.

Figure 11A:
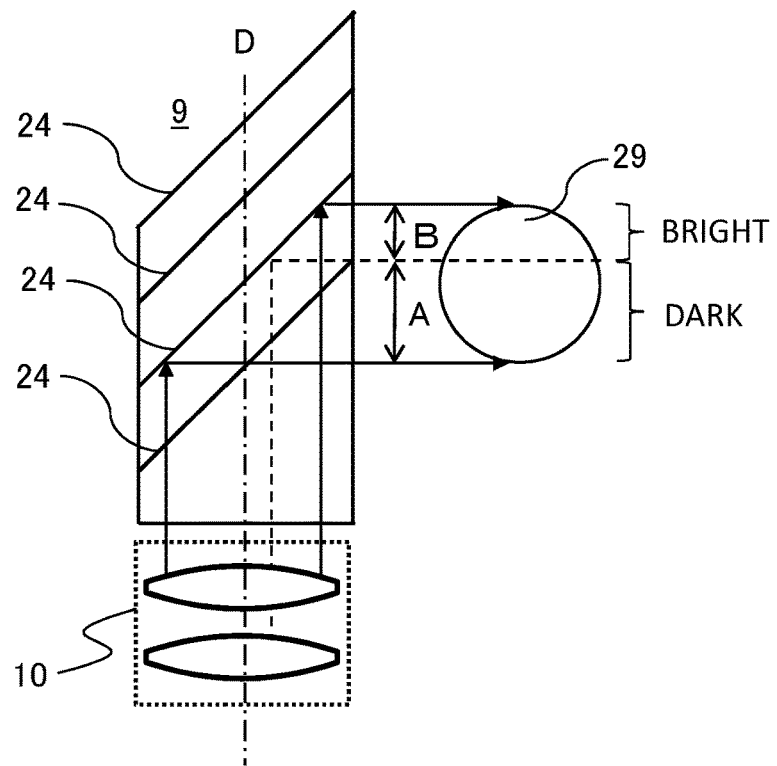
FIGS. 11A and 11B are views schematically illustrating an exit pupil reflected and emitted by one partial reflection surface in the pupil enlargement prism according to the first embodiment.
Figure 11B:
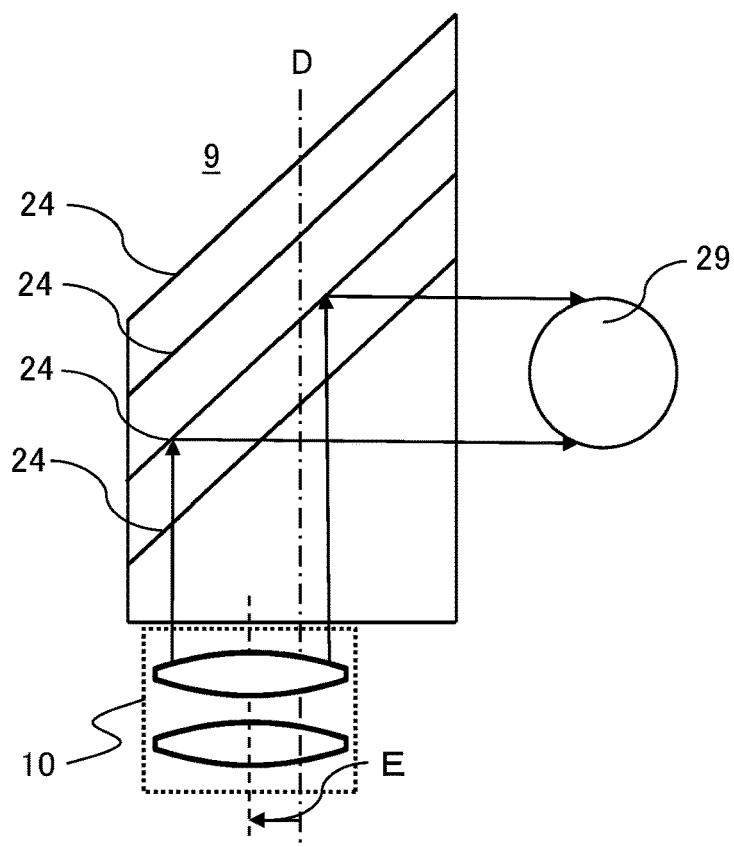

FIGS. 11A and 11B schematically illustrate the exit pupil 29 that is reflected and emitted by the second partial reflection surface 24 as an example. In the case illustrated in FIG. 11A, in the exit pupil 29 reflected and emitted by the second partial reflection surface is divided into a region A transmitted and emitted through the first partial reflection surface and a region B directly emitted without being transmitted through the first partial reflection surface. Since the partial reflection surface 24 has a predetermined transmittance, the region A where a larger amount of light passes through the partial reflection surface 24 becomes darker than the region B, and thus, a brightness difference occurs between the region A and the region B, and brightness unevenness occurs in the exit pupil distribution at the boundary by the dotted line in the exit pupil 29, so that brightness unevenness occurs in the image projected by the light-guiding plate.

Therefore, in order to emit uniform exit pupil, it is required to overlap the partial reflection surfaces so that all the lights reflected on the N-th partial reflection surface are transmitted through the (N−1)-th partial reflection surface. (N is an integer of 2 or more). Therefore, as illustrated at E in FIG. 11B, by arranging the central axis of the projection optical unit 10 to be decentered with respect to the central axis D of the pupil enlargement prism 9 in a direction opposite to an outgoing direction of the pupil enlargement prism 9, all the exit pupils reflected and emitted by the second partial reflection surface can be transmitted through the first partial reflection surface. With such a configuration, the exit pupil 29 can be emitted without brightness unevenness. Similarly, all the exit pupils reflected and emitted by the third partial reflection surface are transmitted through the second partial reflection surface, and all the exit pupils reflected and emitted by the fourth partial reflection surface are transmitted through the third partial reflection surface. For this reason, the pupil enlargement prism 9 can uniformly emit the exit pupil.

By configuring the partial reflection surface 24 of the pupil enlargement prism 9 and the projection optical unit 10 as described above, the exit pupil can be duplicated uniformly, and a wide eye box can be realized without brightness unevenness in the image light projected by the light-guiding plate.

<Reflectance of Pupil Enlargement Prism>

While propagating through the inside of the pupil enlargement prism 9, the intensity of the image light incident on the pupil enlargement prism 9 is attenuated each time the image light is reflected by or transmitted through the plurality of partial reflection surfaces 24. Therefore, by gradually increasing the reflectance of the partial reflection surface as the distance from the incident surface side is increased, the intensity density of the image light output by the pupil enlargement prism 9 can be allowed to be substantially constant, and the brightness unevenness of the image visually recognized by the user can be reduced. In particular, among the partial reflection surfaces 24 of the pupil enlargement prism 9, the partial reflection surface 24 arranged at the uppermost portion (partial reflection surface farthest from the incident surface) is preferably mirror-coated with aluminum or silver. With such a structure, substantially all the image lights incident on the pupil enlargement prism 9 can be emitted to be used.

In addition, in the partial reflection surfaces 24 of the pupil enlargement prism 9, in order to obtain a predetermined reflectance, the partial reflection surface 24 may have a metal film coat made of aluminum or silver. Accordingly, since the metal film has little polarization dependence of the reflectance and the transmittance, the image display device 1 can display an image having uniform brightness irrespective of the polarization of the image light output by the projection optical unit 5. In addition, similarly, in order to obtain predetermined reflectance on the partial reflection surface 13 of the light-guiding plate 8, the partial reflection surface array 14 may have a metal film coat made of aluminum or silver.

From another viewpoint of the present embodiment, in order to obtain a predetermined reflectance on the partial reflection surface array 14 of the light-guiding plate 8 and the partial reflection surface 24 of the pupil enlargement prism 9, a dielectric multilayer film coat may be included. The reflectance and transmittance characteristics of the dielectric multilayer film coat depend on the incident polarized light, and thus, typically, the reflectance of S-polarized light is higher than the reflectance of P-polarized light. In the present embodiment, the pupil enlargement prism 9 and the light-guiding plate 8 are arranged with such a configuration that the normal vector of the partial reflection surface 24 of the pupil enlargement prism 9 is located in the xy plane, and the normal vector of the partial reflection surface array 14 of the light-guiding plate 8 is located in the xz plane. For this reason, the image light incident as the S-polarized light on the partial reflection surface 24 of the pupil enlargement prism 9 is incident as substantially P-polarized light on the partial reflection surface array 14 of the light-guiding plate 8. In addition, the image light incident as P-polarized light on the partial reflection surface 24 of the pupil enlargement prism 9 is incident as substantially S-polarized light on the partial reflection surface array 14 of the light-guiding plate 8.

For this reason, the image light duplication unit 6 and the light-guiding plate 8 according to the present embodiment may be configured as follows. That is, the image light duplication unit 6 includes one or both of the polarizing plate and the wavelength plate and the pupil enlargement prism 9. In order to obtain a predetermined reflectance on the partial reflection surface array 14 of the light-guiding plate 8 and the partial reflection surface 24 of the pupil enlargement prism 9, the partial reflection surface array 14 and the partial reflection surface 24 have a dielectric multilayer film coat. The image light emitted by the projection optical unit 5 passes through one or both of the polarizing plate and the wavelength plate and is incident on the pupil enlargement prism 9. The polarization of the light incident on the pupil enlargement prism 9 is polarization (for example, +45-degree polarization, −45-degree polarization, clockwise polarization, counterclockwise polarization, or the like) other than S-polarization and P-polarization with respect to the partial reflection surface 24.

The reflectances of S-polarized light and P-polarized light are denoted by RS and RP. As an example, the reflectance of the partial reflection surface 24 for uniformly duplicating the exit pupil in the case of the pupil enlargement prism having four partial reflection surfaces 24 is exemplified as follows. In the first partial reflection surface, RS is 30 to 50% and RP is 5 to 15%; in the second partial reflection surface, RS is 45 to 60% and RP is 15 to 25%; in the third partial reflection surface, RS is 75 to 85% and RP is 30 to 40%; and in the fourth partial reflection surface, RS and RP are 90% or more. Accordingly, the light flux amounts of the image lights reflected by the partial reflection surfaces 24 and emitted from the light-guiding plate 8 become substantially equal to each other, and thus, the brightness of the image visually recognized by the user can be allowed to be substantially uniform.

As described above, by adjusting the reflectance of the plurality of partial reflection surfaces 24, the exit pupil can be duplicated uniformly. In addition, substantially all the image lights incident on the pupil enlargement prism 9 can be emitted toward the light-guiding unit and used, and the exit pupil can be duplicated with high light use efficiency to realize a wide eye box.

In addition, the partial reflection surfaces may be bonded with an optical contact instead of an adhesive. By bonding with an optical contact, since scattering of light that may occur due to the adhesive can be suppressed, it is possible to improve the contrast and the see-through property.

<Method of Coupling Pupil Enlargement Prism with Light-Guiding Plate and Image Distortion Correction>

Figure 12A:
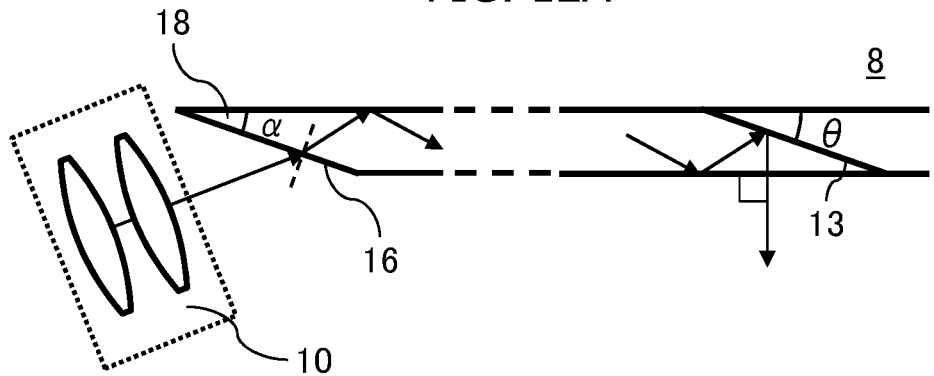
FIGS. 12A to 12C are views describing a relationship between incident light on the light-guiding plate and image distortion in the first embodiment.
Figure 12B:
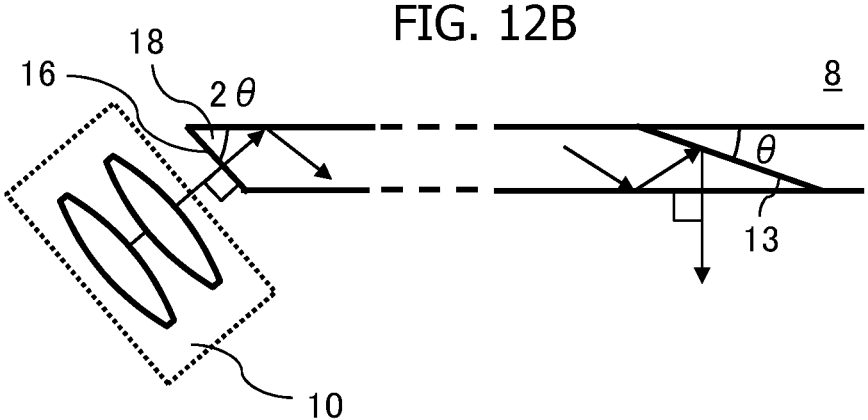
Figure 12C:
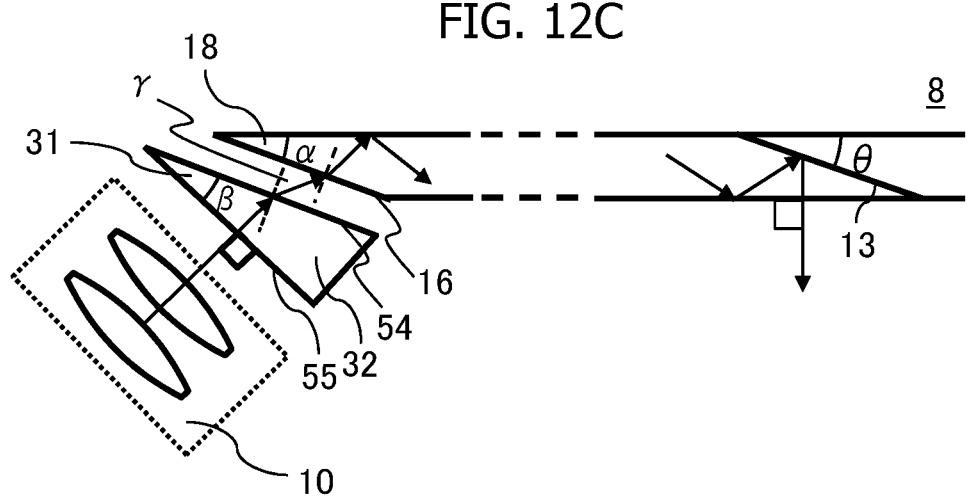

Next, a method of coupling the pupil enlargement prism 9 with the light-guiding plate 8 will be described. First, as a premise, a relationship between the incident light incident on the light-guiding plate 8 and the image distortion will be described. FIGS. 12A to 12C are views describing the relationship between the incident light incident on the light-guiding plate and the image distortion according to the present embodiment. In FIGS. 12A to 12C, the pupil enlargement prism 9 and the optical paths are omitted for simplification. FIG. 12A illustrates an optical path of a main light beam at the center of the angle of view which is incident from the incident surface 16 of the light-guiding plate 8, is reflected by the partial reflection surface 13, and is emitted from the front of the light-guiding plate 8. If the angle α of the vertex angle 18 of the light-guiding plate is not 2θ which is twice the partial reflection surface angle θ as illustrated in FIG. 12A, the image distortion occurs in order to refract the main light beam at the center of the angle of view with the incident surface 16. For this reason, by setting the vertex angle 18 of the light-guiding plate to 2θ as illustrated in FIG. 12B, the main light beam at the center of the angle of view is emitted from the light-guiding plate without refraction, so that the image distortion can be eliminated.

In addition, a triangular prism 32 for correcting the image distortion may be arranged as illustrated in FIG. 12C. The image light is perpendicularly incident on the incident surface 55 of the triangular prism, and the image light is refracted and emitted by only a predetermined angle γ at the outgoing surface 54 of the triangular prism, so that the image distortion due to the refraction on the incident surface 16 of the light-guiding plate is corrected. When the angle γ is set to the angle α of the vertex angle 18 of the light-guiding plate and the partial reflection surface angle θ and the refractive index of the light-guiding plate is set to n, the image distortion can be corrected by setting arcsin (n sin (2θ−α)). In order to emit the image light by refracting the image light at an angle arcsin (n sin (2θ−α)), the triangular prism 32 is made of the same medium as the light-guiding plate 8 or a medium having substantially the same refractive index, so that the triangular prism 32 may satisfy that an angle β of the vertex angle 31 is β=2θ−α.

In the configuration of FIG. 12C, the incident surface 16 of the light-guiding plate is wider than that in the configuration of FIG. 12B, and thus, the amount of light incident on the light-guiding plate can be increased, so that the light use efficiency of the entire image display device can be improved. In a case where the light-guiding plate is manufactured by cutting from a substrate, a shape in which the angle α of the vertex angle 18 is substantially equal to θ is advantageous in terms of manufacturing since the process of cutting the incident surface is reduced. For this reason, from the viewpoint of manufacturing, it is preferable that α=β=θ.

Figure 13A:
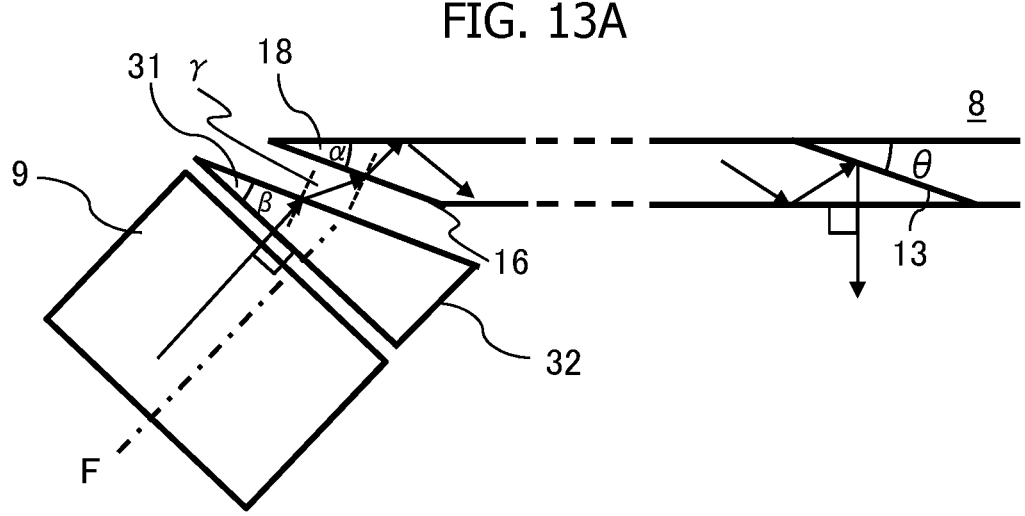
FIGS. 13A to 13D are views for describing a method of coupling image light incident on the light-guiding plate according to the first embodiment.

Next, in a case where the pupil enlargement prism 9 is to be arranged, the triangular prism 32 may be arranged after the exit of the pupil enlargement prism 9 as illustrated in FIG. 13A. As described above, in order to emit the image light by refracting the image light at an angle arcsin (n sin (2θ−α)), the triangular prism 32 is made of the same medium as the light-guiding plate 8 or a medium having substantially the same refractive index, so that the triangular prism 32 may satisfy that an angle β of the vertex angle 31 is β=2θ−α.

Figure 13B:
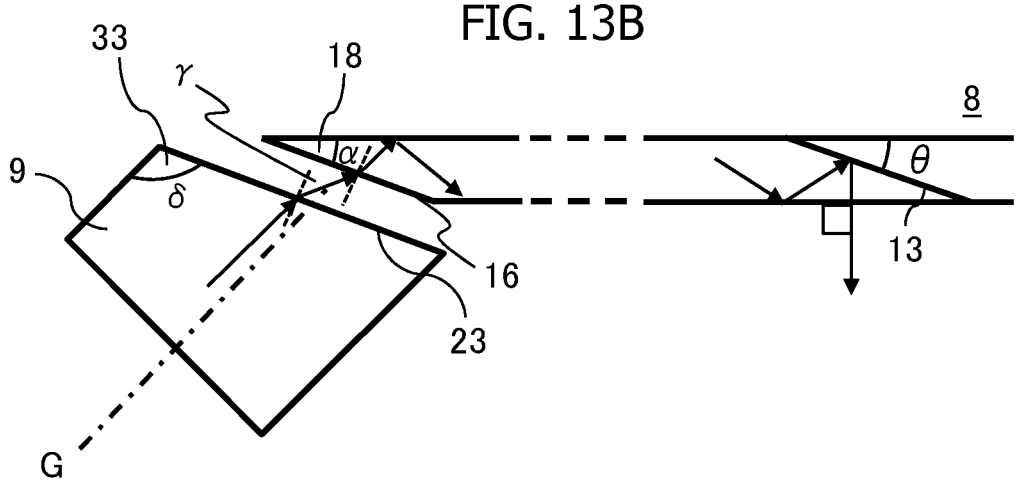

In addition, as illustrated in FIG. 13B, instead of the triangular prism 32, the pupil enlargement prism 9 can be allowed to have a function of image distortion correction. That is, by refracting the image light by only the predetermined angle γ at the outgoing surface 23 of the pupil enlargement prism 9 and emitting the image light, the image distortion due to the refraction at the incident surface 16 of the light-guiding plate is corrected. When the vertex angle 18 of the light-guiding plate is the angle α and the partial reflection surface angle is θ, by setting the angle γ to arcsin (n sin (2θ−α)) and setting the refractive index of the light-guiding plate to n, the image distortion can be corrected. An example of the pupil enlargement prism 9 for refracting the image light at an angle arcsin (n sin (2θ−α)) and emitting the image light is described. The pupil enlargement prism 9 is made of the same medium as the light-guiding plate, or a medium having substantially the same a refractive index, so that the pupil enlargement prism 9 may satisfy that δ=2θ+90 degrees as the angle δ of the pupil enlargement prism angle 33 is set to an obtuse angle.

Figure 13C:
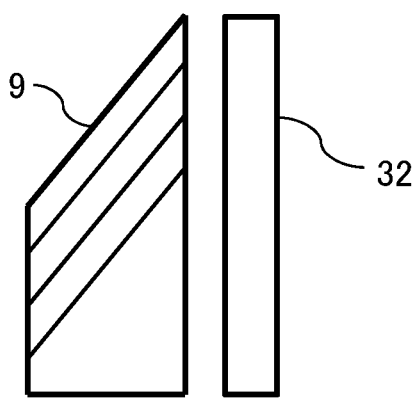
Figure 13D:
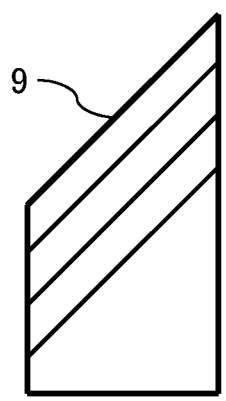

FIG. 13C illustrates a cross-sectional view taken along a dotted line F in FIG. 13A, and FIG. 13D illustrates a cross-sectional view taken along a dotted line G in FIG. 13B. As can be seen from comparison between FIG. 13D and FIG. 13C, by allowing the pupil enlargement prism 9 to have a function of image distortion correction, the partial reflection surface becomes longer, and this is effective from the viewpoint of performing the above-described overlapping and emitting uniform exit pupils. In addition, by allowing the pupil enlargement prism 9 to have a function of image distortion correction, the number of components of the image display device 1 can be reduced, and it is possible to implement a decrease in cost, a reduction in mass, and a reduction in size.

Figure 14:
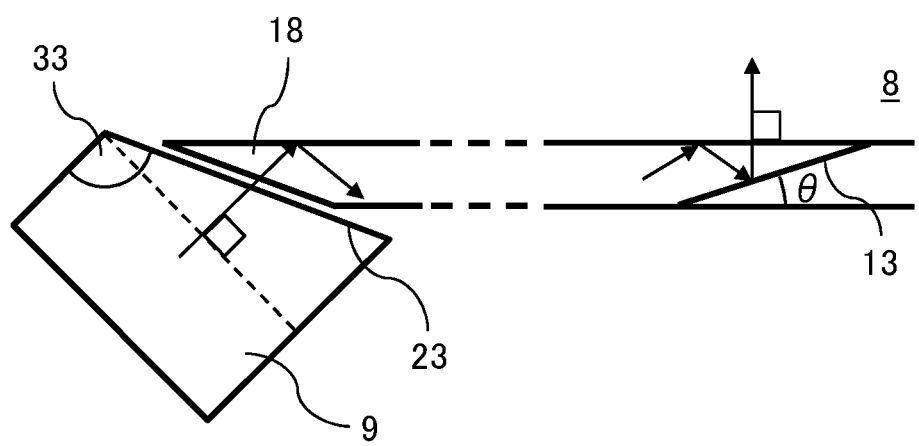
FIG. 14 is a configuration view of the light-guiding plate according to the first embodiment in which an angle of the partial reflection surface is different from that of the light-guiding plate surface by 180 degrees.

In addition, as illustrated in FIG. 14, the angle of the partial reflection surface 13 may be allowed to be different from the light-guiding plate surface by 180 degrees. In this case, the pupil of the user is located on the opposite side of the light-guiding plate 8 from FIGS. 13A and 13B.

<Stray Light of Pupil Enlargement Prism>

Figure 15A:
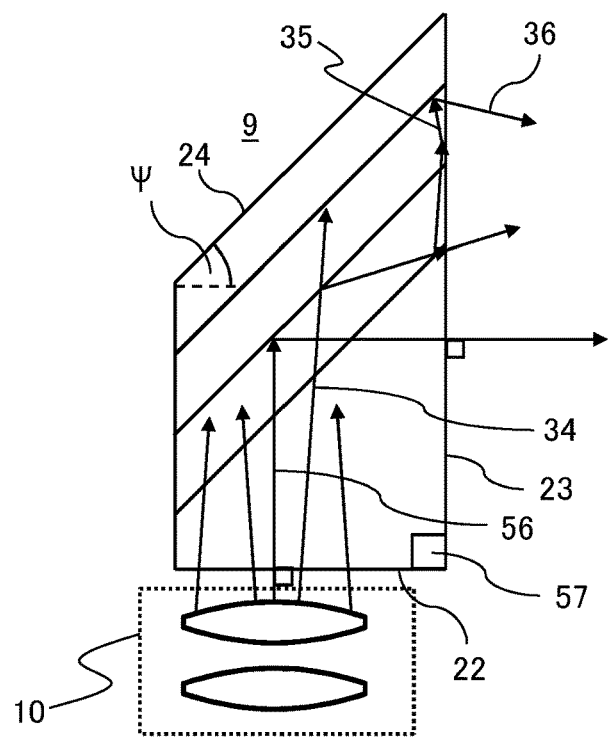
FIGS. 15A and 15B are views describing optical paths of image lights incident on the pupil enlargement prism according to the first embodiment.
Figure 15B:
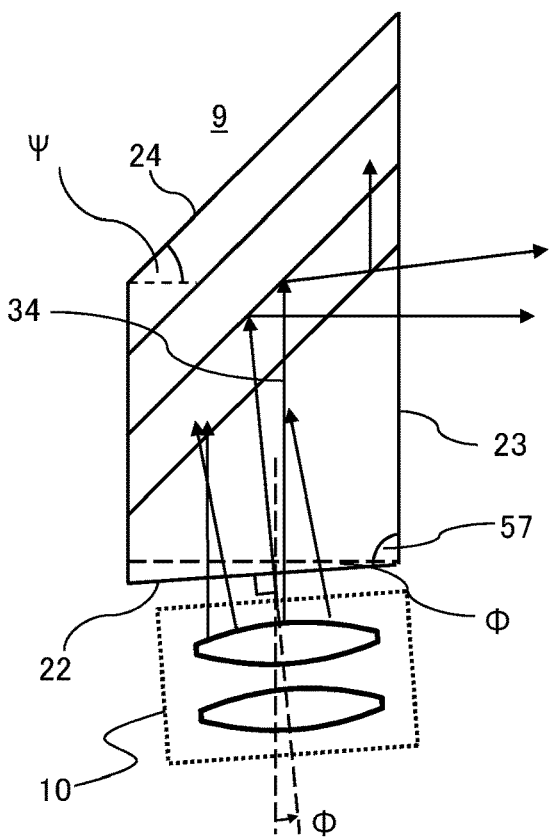

FIGS. 15A and 15B are views describing optical paths of image lights that are incident on the pupil enlargement prism according to the present embodiment. That is, the views illustrate an example of the light beams of the image light that are emitted by the projection optical unit 10, are incident on the pupil enlargement prism 9, and propagate inside the pupil enlargement prism 9.

In FIGS. 15A and 15B, in order to prevent the image from being distorted, the main light beam at the center of the angle of view indicated by the light beam 56 needs to be perpendicularly incident on the incident surface 22 and the outgoing surface 23 of the pupil enlargement prism. In a case where the angle 57 between the incident surface and the outgoing surface of the pupil enlargement prism is a right angle, the angle ψ from the surface of the partial reflection surface 24 orthogonal to the outgoing surface 23 may be 45 degrees.

The light beam 34 is a light beam of which angle emitted by the projection optical unit 10 in FIG. 15A is in the rightmost direction. If the light incident at an angle such as the light beam 34 is totally reflected by the outgoing surface 23 or the side surface 37 similarly to the light beam 35 and is emitted similarly to the light beam 36, an inverted image is projected to the user.

In order to prevent this problem, it is effective to incline the projection optical unit 10 and allow the light to be incident on the pupil enlargement prism 9 as illustrated in FIG. 15B. At this time, the angle 57 between the incident surface and the outgoing surface of the pupil enlargement prism of the pupil enlargement prism 9 is inclined by only the angle φ at which the projection optical unit is inclined, and thus, the angle ψ of the partial reflection surface is allowed to be larger than 45 degrees and ψ=45 degrees+φ÷2, so that it is possible to eliminate the light totally reflected and emitted similarly to the light beam 36. In addition, the main light beam at the center of the angle of view is perpendicularly incident on the incident surface 22 and the outgoing surface 23 of the pupil enlargement prism, so that image distortion does not occur. In order to eliminate the stray light of total internal reflection as described above, when the refractive index of the pupil enlargement prism 9 is denoted by n and the angle of view in the vertical direction is denoted by FOV_V, the inclination angle φ is required to be arcsin (sin (FOV_V÷2)÷n) or more.

In addition, it is preferable that the side surfaces 25, 26, 27, and 37 of the pupil enlargement prism 9 are subjected to one or both of sandblasting and blackening. Accordingly, it is possible to prevent the stray light of the inverted image caused by the light incident on the side surfaces 25, 26, 27, and 37 from being generated.

<Cut of Pupil Enlargement Prism>

Figure 16A:
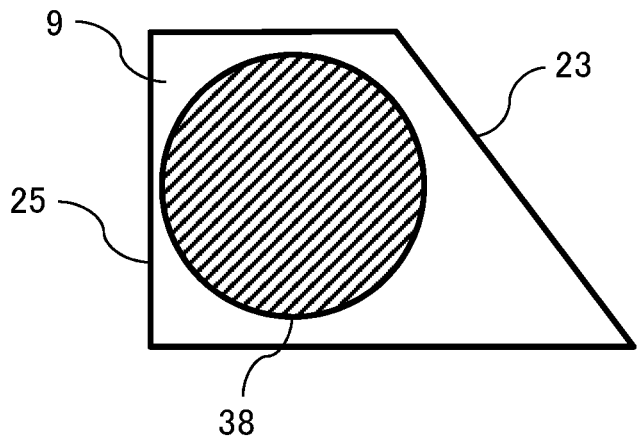
FIGS. 16A to 16C are views describing a shape of the pupil enlargement prism according to the first embodiment.
Figure 16B:
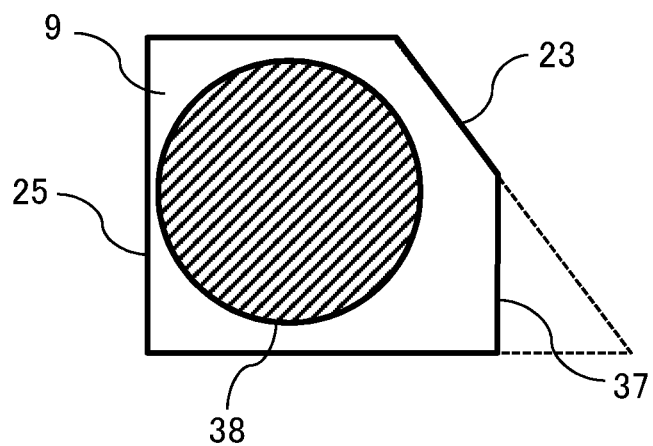
Figure 16C:
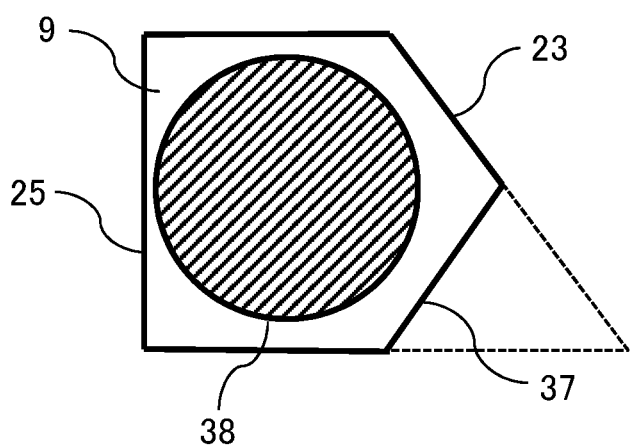

Next, the outer shape of the pupil enlargement prism 9 will be described from the viewpoint of miniaturization. FIGS. 16A to 16C are views of the pupil enlargement prism 9 as viewed from the upper side, and the light flux diameter 38 indicates the diameter at which the light flux has the largest amount among the light fluxes emitted by the projection optical unit. In the pupil enlargement prism 9 illustrated in FIG. 16A, the region having no light flux diameter 38 can be cut. An example is illustrated in FIGS. 16B and 16C. FIG. 16B illustrates the pupil enlargement prism 9 cut so that the side surface 37 is parallel to the side surface 25. FIG. 16C illustrates the pupil enlargement prism 9 obtained by further cutting FIG. 16B for miniaturization so that the light flux diameter 38 is not cut off. FIGS. 16B and 16C are smaller in size than FIG. 16A, but the number of sides constituting the outer shape is increased by one. Therefore, as compared with the pupil enlargement prism 9 in FIG. 16A, the process for cutting is added. In addition, as comparing FIGS. 16B and 16C, the pupil enlargement prism 9 of FIG. 16B in which the side surface 37 is parallel to the side surface 25 requires less jigs for cutting, and thus, it is possible to perform manufacturing at low cost. As described above, an example in which the light flux diameter 38 cannot be cut has been described, but with emphasis on miniaturization, cutting may be performed to reduce the light flux diameter 38.

As described above, according to the present embodiment, it is possible to provide an image display device having a wide eye box and being capable of displaying a uniform image with high light use efficiency and reduced brightness unevenness, and an HMD using the same.

Second Embodiment

Figure 17A:
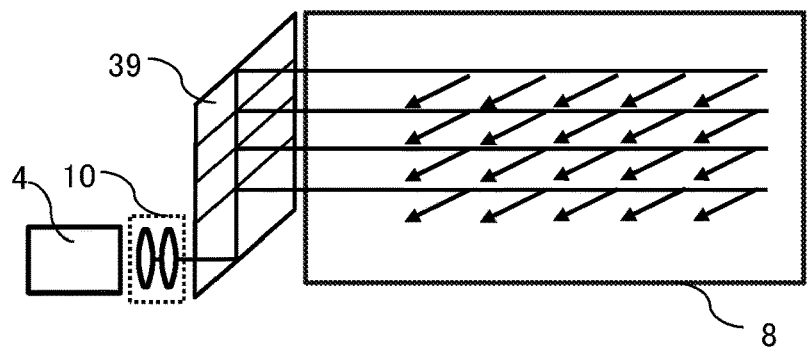
FIGS. 17A and 17B are configuration views of an image display device according to a second embodiment.
Figure 17B:
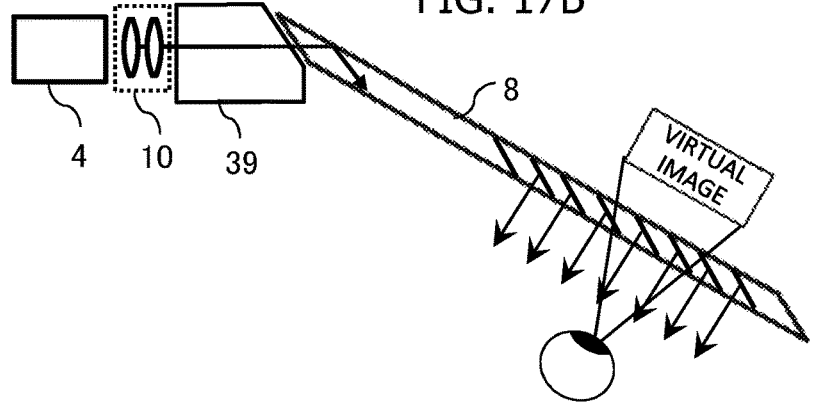

FIGS. 17A and 17B are configuration views of the image display device according to the present embodiment. FIG. 17A illustrates a view as viewed from the front side of the light-guiding plate 8, and FIG. 17B illustrates a view as viewed from the upper side of the light-guiding plate 8. In FIGS. 17A and 17B, the same components as those in FIGS. 4A and 4B are denoted by the same reference numerals, and description thereof will be omitted. FIGS. 17A and 17B are different from FIGS. 4A and 4B in that a pupil enlargement prism 39 is provided instead of the pupil enlargement prism 9, and the image generation unit 4 and the projection optical unit 10 are arranged in the lateral direction of the pupil enlargement prism 39 on the paper.

Figure 18:
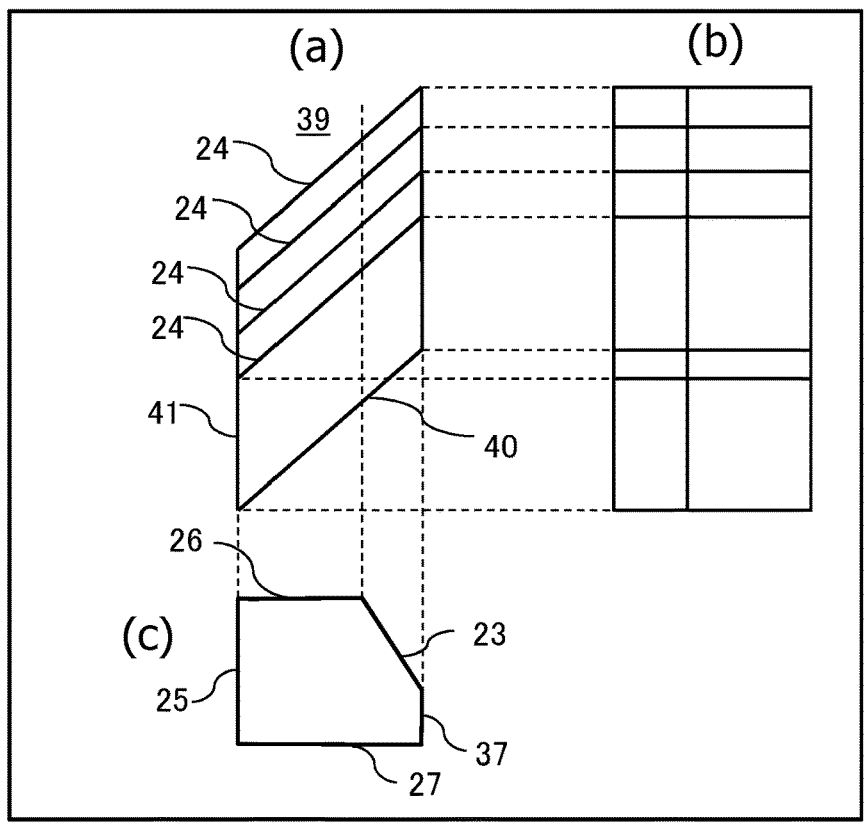
FIG. 18 is a view describing a configuration of a pupil enlargement prism according to the second embodiment.

FIG. 18 is a view describing the configuration of the pupil enlargement prism 39 according to the present embodiment. In FIG. 18, (a), (b), and (c) illustrate a front view, a side view, and a plan view of the pupil enlargement prism 39, respectively.

In FIG. 18, the pupil enlargement prism 39 has an incident surface 41 and an outgoing surface 23 and has a plurality of partial reflection surfaces 24 and a reflection surface 40 for coupling image light. The pupil enlargement prism 39 according to the present embodiment is different from FIGS. 4A and 4B in that, in addition to the partial reflection surface 24 for duplicating the exit pupils, the reflection surface 40 for coupling image light from the projection optical unit is included.

The reflection surfaces 40 for being coupled with the plurality of partial reflection surfaces 24 are substantially parallel to each other. FIG. 18 illustrates the pupil enlargement prism 39 having four partial reflection surfaces 24 as an example, but the number of partial reflection surfaces may be smaller or larger than four.

The image light emitted by the projection optical unit 10 which is a projection optical unit is incident from the incident surface 41 on the pupil enlargement prism 39, is reflected by the reflection surface 40 for coupling, is reflected by or transmitted through the plurality of partial reflection surfaces 24, and is emitted.

Figure 19:
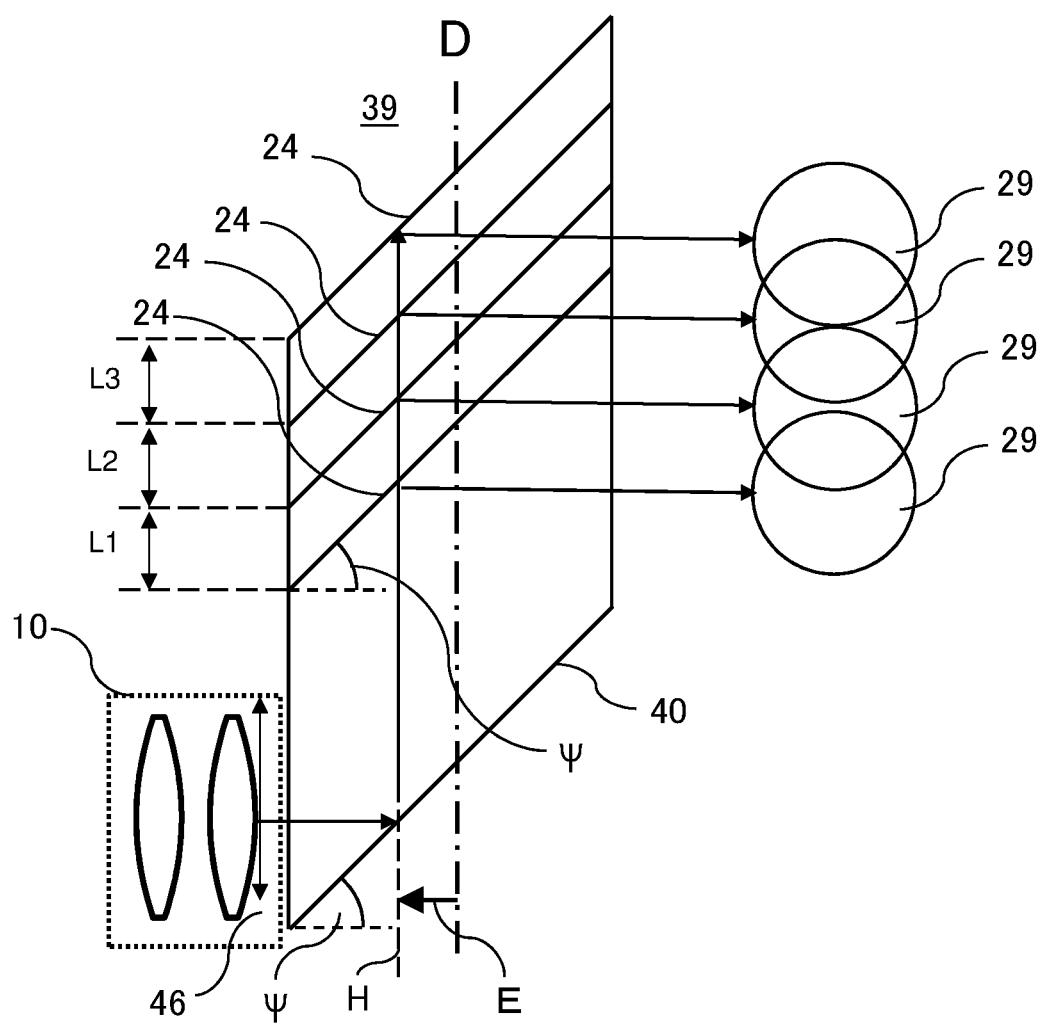
FIG. 19 is a view describing an exit pupil duplicated by the pupil enlargement prism according to the second embodiment.

FIG. 19 is a view describing an exit pupil that is duplicated by the pupil enlargement prism according to the present embodiment. That is, the positional relationship between the main light beam of the projection optical unit 10 and the exit pupil 29 duplicated by the pupil enlargement prism 39 is schematically illustrated. Actually, the optical path where the light is reflected twice or more on the partial reflection surface 24 can be also considered, but from the viewpoint of light use efficiency of the optical path illustrated in FIG. 19, the optical path where a main component of the image light is reflected twice or more is omitted.

FIG. 19 illustrates the pupil enlargement prism 39 having four partial reflection surfaces 24 as an example. The number of partial reflection surfaces may be smaller or larger than four. As described in the first embodiment, in order to duplicate the exit pupils without causing image loss or dark lines, the plurality of duplicated exit pupils 29 need to be overlapped. That is, the intervals L1, L2, and L3 between the partial reflection surfaces 24 may be allowed to be smaller than the exit pupil diameter. In other words, the intervals L1, L2, and L3 between the partial reflection surfaces 24 may be allowed to be smaller than the projection lens diameter 46. With such a configuration, the pupil enlargement prism 39 can duplicate the exit pupil without causing image loss or dark lines.

Next, the configurations of the pupil enlargement prism 39 and the projection optical unit 10 for emitting a uniform exit pupil will be described.

In order to emit a uniform exit pupil, it is necessary to overlap the partial reflection surfaces 24 so that all the lights reflected by the N-th partial reflection surface 24 are transmitted through the (N−1)-th partial reflection surface 24. (N is an integer of 2 or more). In addition, as illustrated in FIG. 19, an optical axis H where light passing through the central axis of the projection optical unit 10 is reflected by the reflection surface 40 is eccentrically arranged as indicated by E in the direction opposite to the outgoing direction of the pupil enlargement prism 39 with respect to the central axis D of the pupil enlargement prism 39, so that all the exit pupils reflected and emitted by the N-th partial reflection surface 24 can be allowed to be transmitted through the (N−1)-th partial reflection surface 24. With such a configuration, the exit pupil 29 can be emitted without brightness unevenness.

In addition, as described in the first embodiment, in order to prevent image inversion caused by total reflection on the side surface or the outgoing surface of the pupil enlargement prism, it is preferable that the angle ψ of the partial reflection surface 24 and the reflection surface 40 is larger than 45 degrees, and ψ=45 degrees+φ÷2. In order to eliminate the stray light of total reflection as described above, when the refractive index of the pupil enlargement prism 39 is denoted by n and the angle of view in the vertical direction is denoted by FOV_V, the inclination angle φ is required to be arcsin (sin (FOV_V÷2)÷n) or more.

As described above, according to the present embodiment, since the reflection surface 40 for coupling the image light is provided inside the pupil enlargement prism 39, the image generation unit 4 and the projection optical unit 10 can be arranged in the lateral direction of the pupil enlargement prism 39, so that the degree of freedom in designing the image display device 1 can be increased.

Third Embodiment

Figure 20A:
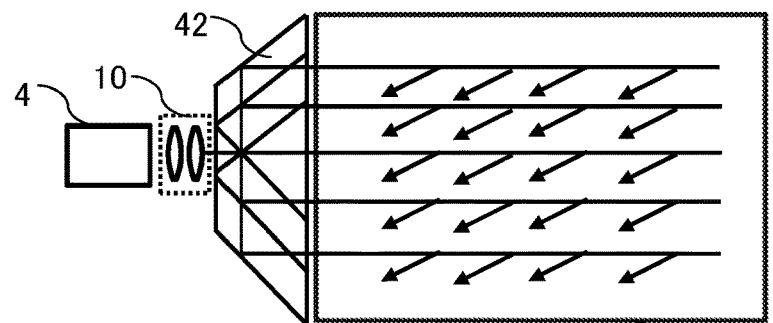
FIGS. 20A and 20B are configuration views of an image display device according to a third embodiment.
Figure 20B:
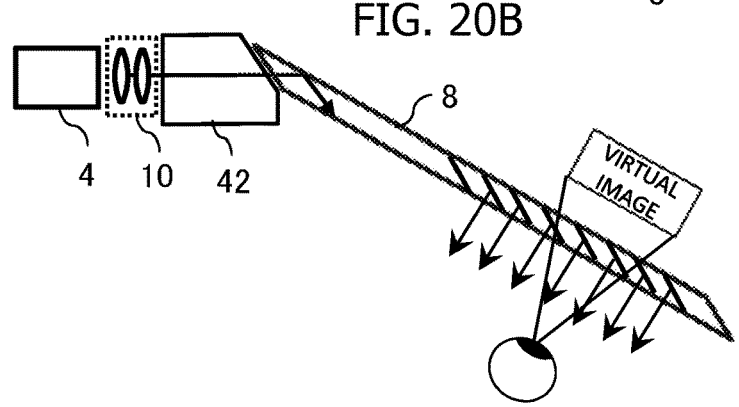
Figure 21:
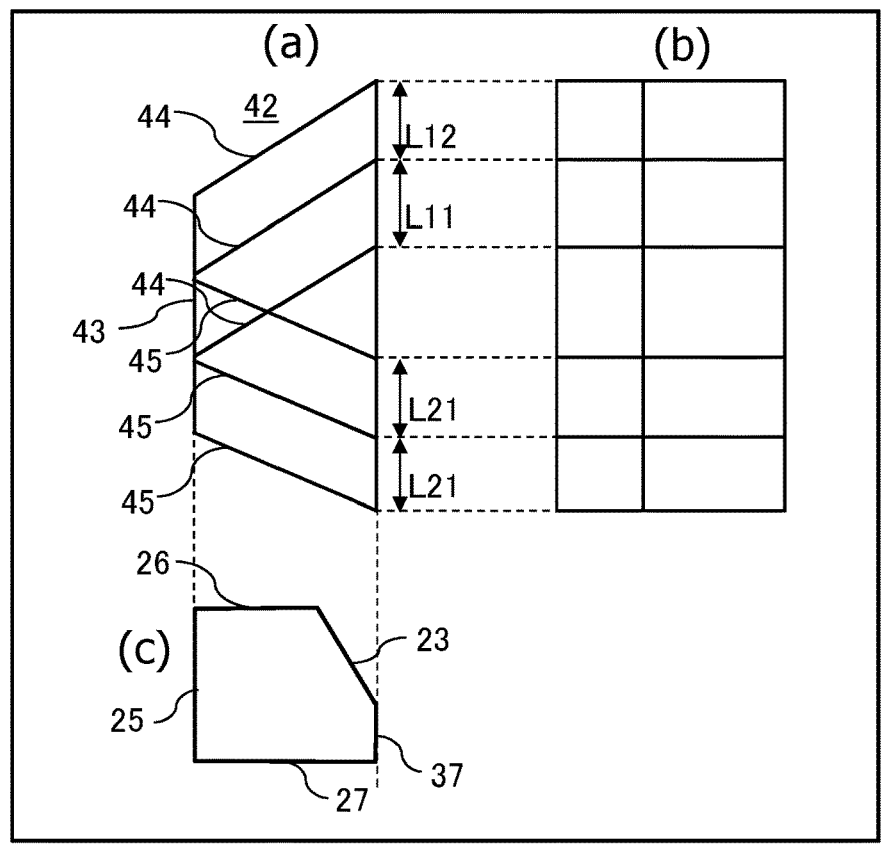
FIG. 21 is a view describing a configuration of a pupil enlargement prism according to the third embodiment.

FIGS. 20A and 20B are configuration views of an image display device according to the present embodiment. FIG. 20A illustrates a view as viewed from the front side of the light-guiding plate 8, and FIG. 20B illustrates a view as viewed from the upper side of the light-guiding plate 8. In FIGS. 20A and 20B, the same components as those in FIGS. 4A and 4B are denoted by the same reference numerals, and description thereof will be omitted. FIGS. 20A and 20B are different from FIGS. 4A and 4B in that a pupil enlargement prism 42 is provided instead of the pupil enlargement prism 9, and the image generation unit 4 and the projection optical unit 10 are arranged in the lateral direction of the pupil enlargement prism 42 on the paper. In FIG. 21, (a), (b), and (c) are a front view, a side view, and a plan view of the pupil enlargement prism 42 according to the present embodiment, respectively.

In FIG. 21, the pupil enlargement prism 42 has an incident surface 43 and an outgoing surface 23 and has at least two or more substantially parallel partial reflection surfaces 44 and at least two or more substantially parallel partial reflection surfaces 45. The partial reflection surface 44 and the partial reflection surface 45 are not parallel to each other, and the angle formed by the partial reflection surface 44 and the partial reflection surface 45 may be approximately 90 degrees or may be other than 90 degrees.

The image light emitted by the projection optical unit 10 which is the projection optical unit is incident on the pupil enlargement prism 42 from the incident surface 43. The image light incident on the pupil enlargement prism 42 is reflected by or transmitted through the partial reflection surface 44 or the partial reflection surface 45, so that the exit pupil of the projection optical unit is duplicated to be emitted from the outgoing surface 23 of the pupil enlargement prism 42.

According to the present embodiment, since the exit pupil is duplicated in the vertical direction by the partial reflection surface 44 and the partial reflection surface 45 and emitted, the projection optical unit 10 which is a projection optical unit can be arranged at the central portion of the light-guiding plate 8. For this reason, the degree of freedom in the design of the image display device can be increased. In addition, as comparison of the pupil enlargement prisms of the first and second embodiments, the distance from the incident surface 43 to the outgoing surface 23 is shortened, so that the exit pupil of the projection optical unit is configured to be easily brought closer to the light-guiding plate incident surface. For this reason, the coupling efficiency of the light-guiding plate can be improved, and the lack of the exit pupil at the time of being incident on the light-guiding plate can be reduced.

Fourth Embodiment

Figure 22A:
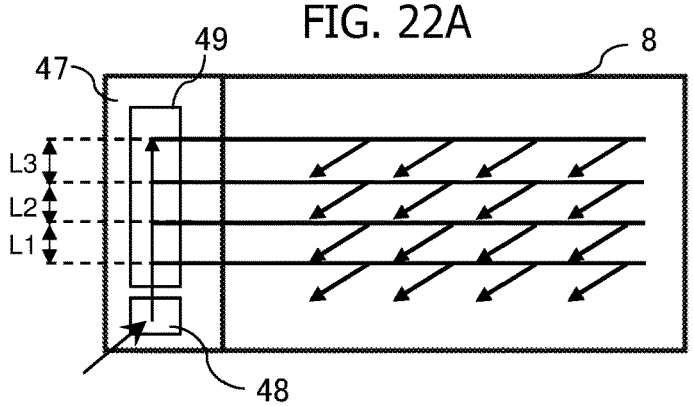
FIGS. 22A and 22B are configuration views of an image display device according to a fourth embodiment.
Figure 22B:
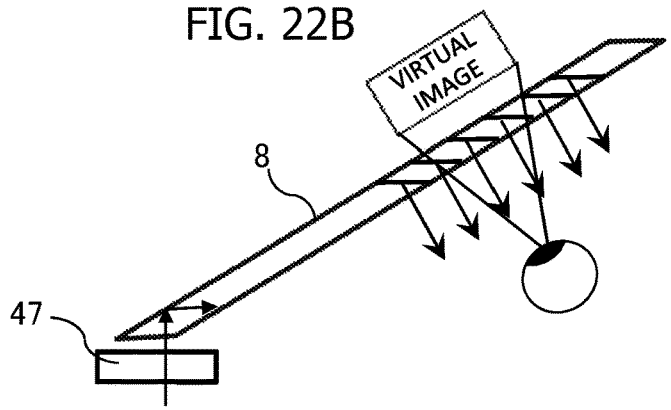

FIGS. 22A and 22B are configuration views of an image display device according to the present embodiment. FIG. 22A illustrates a view as viewed from the front side of the light-guiding plate 8, and FIG. 22B illustrates a view as viewed from the upper side of the light-guiding plate 8. In FIGS. 22A and 22B, the same components as those in FIGS. 4A and 4B are denoted by the same reference numerals, and description thereof will be omitted. FIGS. 22A and 22B are different from FIGS. 4A and 4B in that an image light duplication unit 47 is provided instead of the pupil enlargement prism 9, and the image light duplication unit 47 has a plurality of diffraction regions 48 and 49.

In FIGS. 22A and 22B, when the image light emitted by the projection optical unit 10 which is the projection optical unit is incident on the diffraction region 48, the image light is diffracted, is received into the image light duplication unit 47, and propagates the inside of the image light duplication unit 47 in the vertical direction of the figure by total reflection. In the process of light guiding by total reflection, a portion of the image light is diffracted each time the image light reaches the diffraction region 49, and the image light is duplicated and emitted from the image light duplication unit 47.

FIGS. 22A and 22B illustrate a case where four exit pupils are duplicated in the vertical direction by the image light duplication unit 47. As described in the first embodiment, in order to duplicate the exit pupil without causing image loss or dark lines, a plurality of duplicate exit pupils need to overlap. That is, the duplication intervals L1, L2, and L3 illustrated in FIGS. 22A and 22B may be allowed to be smaller than the exit pupil diameter and need to be smaller than the projection lens diameter 46. With such a configuration, the image light duplication unit 47 can duplicate the exit pupil without causing image loss or dark lines.

Figure 23A:
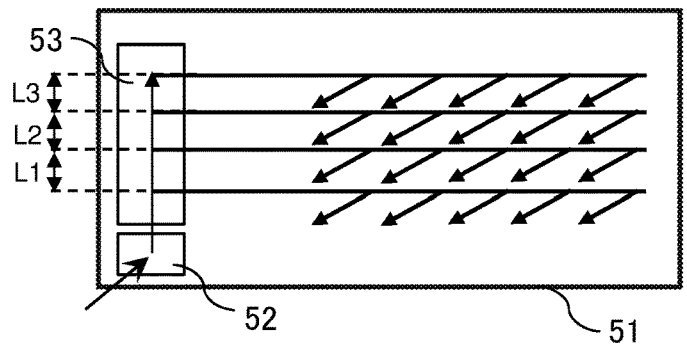
FIGS. 23A and 23B are another configuration views of the image display device in the fourth embodiment.
Figure 23B:
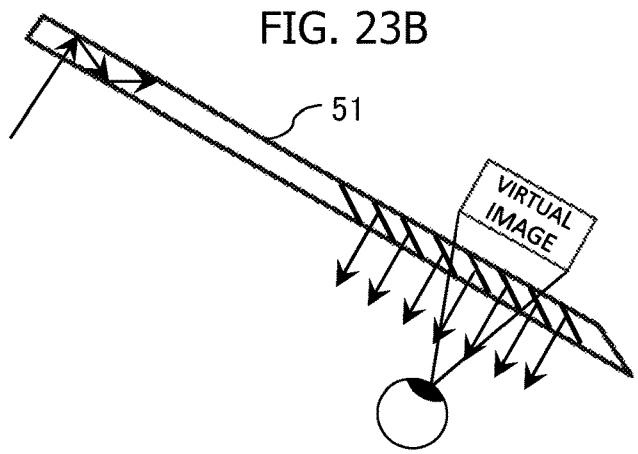

In addition, as illustrated in FIGS. 23A and 23B, the light-guiding plate 51 may be provided with a plurality of diffraction regions 52 and 53, and the light-guiding plate 51 may be provided with the image light duplication unit 47. In this case, the diffraction grating constituting the diffraction region can be realized by, for example, a reflection type volume hologram or a transmission type volume hologram. Similarly, the exit pupils need to overlap each other in order to duplicate the exit pupils without causing image loss or dark lines, and the duplication intervals L1, L2, and L3 may be allowed to be smaller than the exit pupil diameter and need to be smaller than projection lens diameter 46. With such a configuration, the image light duplication unit 47 can duplicate the exit pupil without causing image loss or dark lines.

According to the present embodiment, as compared with the pupil enlargement prism 9 that duplicates the exit pupil by the internal partial reflection surface, the image light duplication unit can be configured to have a small size by using a diffraction grating or a reflection type volume hologram or a transmission type volume hologram.

Although the embodiments have been described above, the present invention is not limited to the above-described embodiments but includes various modifications. For example, the above-described embodiments have been described in detail in order to explain the present invention for the easy understanding, and the embodiments are not necessarily limited to those having all the configurations described above. In addition, a portion of the configurations of one embodiment can be replaced with the configurations of another embodiment, and the configurations of one embodiment can be added to the configurations of another embodiment. In addition, for a portion of the configuration of each embodiment, it is possible to add, delete, or replace other configurations.

What is claimed is:

1. An image display device projecting an image to a user, comprising:
   an image generation unit that generates image light;
   a projection optical unit that projects the image light generated by the image generation unit;
   an image light duplication unit that duplicates and emits the image light projected by the projection optical unit; and
   a light-guiding unit that projects the image light duplicated by the image light duplication unit to a user,
   wherein the projection optical unit includes at least one projection lens, and
   wherein an interval at which the image light duplication unit duplicates the image light is smaller than an outer diameter of the projection lens.

2. The image display device according to claim 1,
   wherein the image light duplication unit has a plurality of partial reflection surfaces that reflect and transmit a portion of incident image light, and the plurality of partial reflection surfaces are arranged inclinedly with respect to an optical axis of the incident image light.

3. The image display device according to claim 2,
   wherein the image light duplication unit is configured with a prism having an incident surface on which the image light is incident, the plurality of partial reflection surfaces, and an outgoing surface from which the duplicated image light is emitted, and
   wherein intervals between the plurality of partial reflection surfaces are smaller than an outer diameter of the projection lens.

4. The image display device according to claim 3, wherein the image light duplication unit has a first partial reflection surface closer to the incident surface and a second partial reflection surface next closer to the incident surface, and all lights reflected on the second partial reflection surface are transmitted through the first partial reflection surface.

5. The image display device according to claim 3, wherein an optical axis of the projection lens is arranged eccentrically in a direction opposite to an outgoing direction of the prism with respect to a central axis of the prism.

6. The image display device according to claim 2,
   wherein the image light duplication unit is configured with a prism having an incident surface on which the image light is incident, a reflection surface that reflects the image light incident from the incident surface, a plurality of partial reflection surfaces that duplicates the image light reflected on the reflection surface, and an outgoing surface from which the duplicated image light is emitted,
   wherein the intervals between the plurality of partial reflection surfaces are smaller than the outer diameter of the projection lens, and
   wherein, in the projection optical unit and the prism, an optical axis where light passing through a central axis of the projection lens is reflected by the reflection surface is arranged so as to be eccentric in a direction opposite to an outgoing direction of the prism with respect to a central axis of the prism.

7. The image display device according to claim 5,
wherein a direction in which the prism is to duplicate the image light is set to a first direction, and
wherein the reflectance of each of the plurality of partial reflection surfaces is increased as it goes from the incident surface side to the first direction.

8. The image display device according to claim 5, wherein the prism has intervals between the plurality of partial reflection surfaces in a range of 1 mm to 15 mm.

9. The image display device according to claim 5, wherein the prism has an angle larger than 45 degrees from a surface of the partial reflection surface orthogonal to the outgoing surface.

10. The image display device according to claim 5, wherein the prism is obtained by bonding the partial reflection surface by an optical contact.

11. The image display device according to claim 5, wherein the prism has an image distortion correction function.

12. The image display device according to claim 11, wherein the image distortion correction function refracts the image light at a predetermined angle and emits the image light when the prism emits the image light.

13. The image display device according to claim 5, wherein an exit pupil of the projection optical unit is located closer to the image light duplication unit than to the projection optical unit.

14. The image display device according to claim 13, wherein the exit pupil of the projection optical unit is located inside the projection optical unit.

15. The image display device according to claim 1,
wherein the light-guiding unit includes:
an incident surface on which image light is incident;
first and second internal reflection surfaces which are substantially parallel to each other and through which incident image light propagates while being totally reflected; and
a light-guiding plate that includes a plurality of substantially parallel partial reflection surface arrays for projecting the image therein.

16. The image display device according to claim 15, wherein the light-guiding plate has an angle of the partial reflection surface array with respect to the first or second internal reflection surface being in a range of 18 degrees to 30 degrees.

17. The image display device according to claim 16, wherein the light-guiding plate is arranged so that the partial reflection surface arrays have substantially no overlap and substantially no gap as viewed from the outgoing direction of the light-guiding plate.

18. The image display device according to claim 17, wherein the reflectance of the partial reflection surface array is 15% or less.

19. A head mounted display equipped with an image display device that projects an image to a user, a sensing unit that detects external information, a communication unit that communicates with an external server, a power supply unit that supplies power, a recording medium that records information, an operation input unit that allows a user to operate, and a control unit that performs control of the entire device,
wherein the image display device includes:
an image generation unit that generates image light;
a projection optical unit that projects the image light generated by the image generation unit;
an image light duplication unit that duplicates and emits the image light projected by the projection optical unit; and
a light-guiding unit that projects the image light duplicated by the image light duplication unit to a user,
wherein the projection optical unit includes at least one projection lens, and
wherein the image light duplication unit is configured with a prism having an incident surface on which the image light is incident, a plurality of partial reflection surfaces that reflect and transmit a portion of the incident image light, and an outgoing surface that emits the duplicated image light, and
wherein the plurality of partial reflection surfaces are arranged inclinedly with respect to an optical axis of the incident image light, and intervals between the plurality of partial reflection surfaces are smaller than an outer diameter of the projection lens.

* * * * *